(12) United States Patent
Qian

(10) Patent No.: US 11,821,848 B2
(45) Date of Patent: Nov. 21, 2023

(54) LASER-BASED NON-DESTRUCTIVE SPIKE DEFECT INSPECTION SYSTEM

(71) Applicant: University of South Carolina, Columbia, SC (US)

(72) Inventor: Yu Qian, Irmo, SC (US)

(73) Assignee: University of South Carolina, Columbia, SC (US)

( * ) Notice: Subject to any disclaimer, the term of this patent is extended or adjusted under 35 U.S.C. 154(b) by 40 days.

(21) Appl. No.: 17/332,067

(22) Filed: May 27, 2021

(65) Prior Publication Data

US 2021/0396685 A1 Dec. 23, 2021

Related U.S. Application Data

(60) Provisional application No. 63/030,976, filed on May 28, 2020.

(51) Int. Cl.
*G01N 21/95* (2006.01)
*G01N 21/88* (2006.01)
*E01B 9/06* (2006.01)

(52) U.S. Cl.
CPC ..... *G01N 21/9515* (2013.01); *G01N 21/8806* (2013.01); *E01B 9/06* (2013.01)

(58) Field of Classification Search
CPC ... G01N 21/9515; G01N 21/8806; E01B 9/06
See application file for complete search history.

(56) References Cited

U.S. PATENT DOCUMENTS

| 5,487,341 | A | * | 1/1996 | Newman | E01B 29/26 104/17.1 |
|---|---|---|---|---|---|
| 6,647,891 | B2 | * | 11/2003 | Holmes | E01B 29/00 104/2 |
| 6,862,936 | B2 | * | 3/2005 | Kenderian | G01M 17/10 73/636 |
| 6,945,114 | B2 | * | 9/2005 | Kenderian | G01N 29/46 73/656 |
| 2004/0003662 | A1 | * | 1/2004 | Kenderian | G01N 29/12 73/579 |
| 2004/0056496 | A1 | * | 3/2004 | Kenderian | G01M 17/10 295/8 |
| 2006/0017911 | A1 | * | 1/2006 | Villar | B61L 23/044 356/4.01 |
| 2006/0201253 | A1 | * | 9/2006 | Gonzales | G01N 29/221 73/643 |

(Continued)

FOREIGN PATENT DOCUMENTS

| CN | 101900708 | A | * | 12/2010 | |
| CN | 108704827 | A | * | 10/2018 | ........... B06B 1/0629 |

(Continued)

OTHER PUBLICATIONS

Machine translation of CN-101900708-A, Dec. 2010 (Year: 2010).*

*Primary Examiner* — Dominic J Bologna
*Assistant Examiner* — Jarreas C Underwood
(74) *Attorney, Agent, or Firm* — Burr & Forman LLP; Douglas L. Lineberry

(57) ABSTRACT

Described herein are a low-cost, non-destructive, and contact-free intelligent inspection system that is field-deployable on a geometry car, high-rail vehicle, or other types of track inspection platforms to identify broken railway/railroad spikes in real-time.

15 Claims, 35 Drawing Sheets

(56) References Cited

U.S. PATENT DOCUMENTS

| | | | | |
|---|---|---|---|---|
| 2012/0152877 A1* | 6/2012 | Tadayon | ................. | B25J 5/005 |
| | | | | 901/30 |
| 2012/0263342 A1* | 10/2012 | Haas | ....................... | G06F 18/00 |
| | | | | 382/100 |
| 2014/0365158 A1* | 12/2014 | Dubois | ................. | G01B 17/06 |
| | | | | 702/104 |
| 2017/0248551 A1* | 8/2017 | Pelivanov | ............ | G01N 29/225 |
| 2017/0267264 A1* | 9/2017 | English | ................. | G01N 27/83 |

FOREIGN PATENT DOCUMENTS

| | | | | | |
|---|---|---|---|---|---|
| EP | 2512031 A1 | * | 10/2012 | ......... | H03H 9/02259 |
| GB | 2545271 A | * | 6/2017 | ......... | G01B 11/0666 |

* cited by examiner

*(a) Different wave propagation*

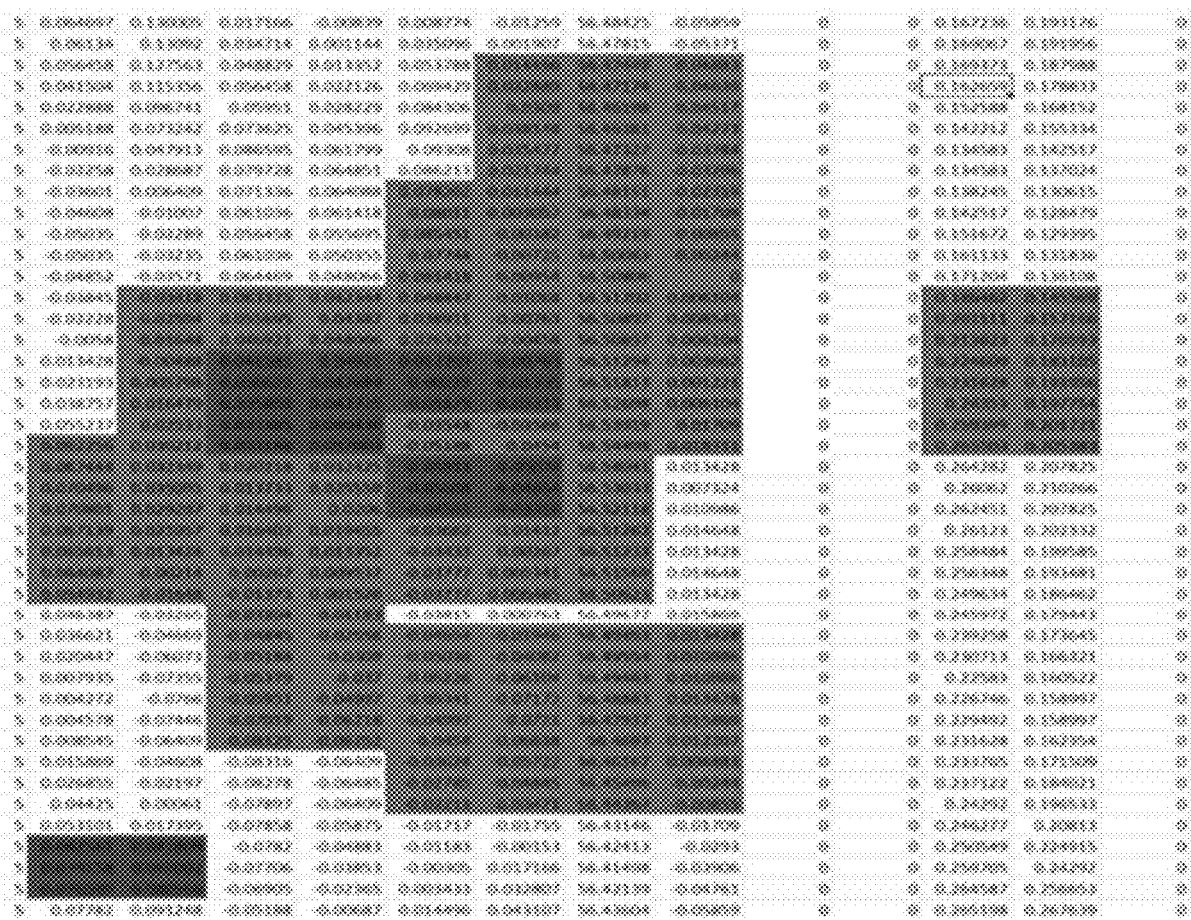
*(b) Trained AI database*
FIGURE 5 (con't)

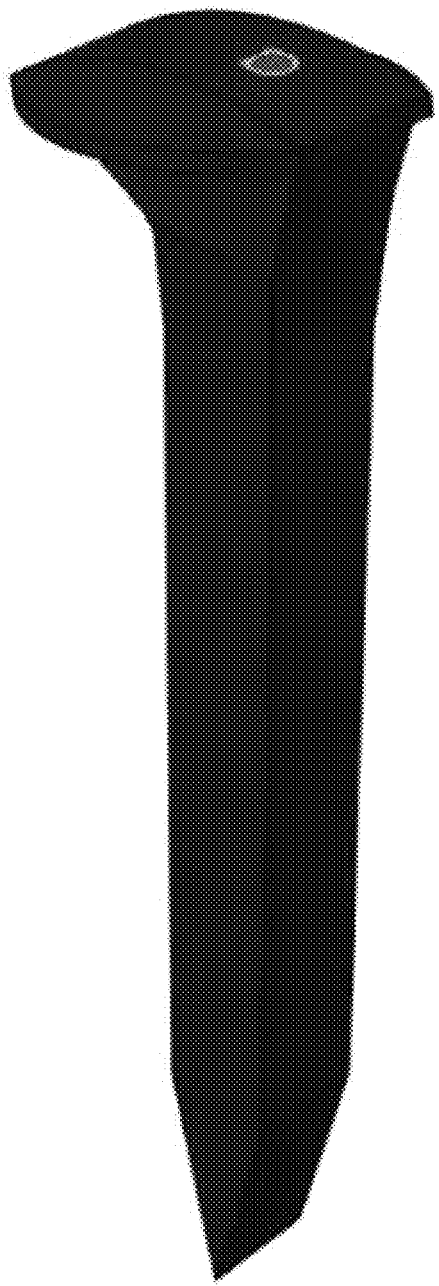
FIGURE 8 (con't)

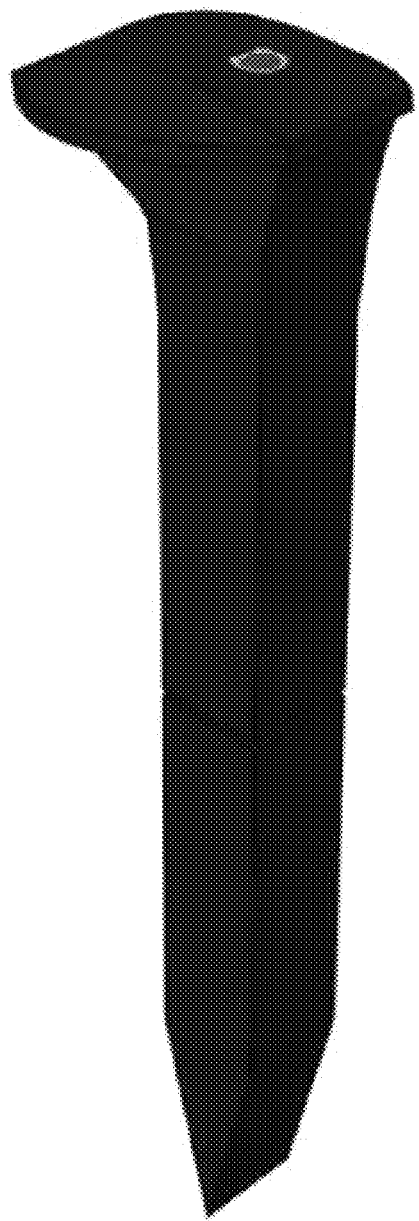
Crack at 2 in. from top
FIGURE 8 (con't)

Laser beam area $A = 4.0 \times 10^{-6}$ m$^2$

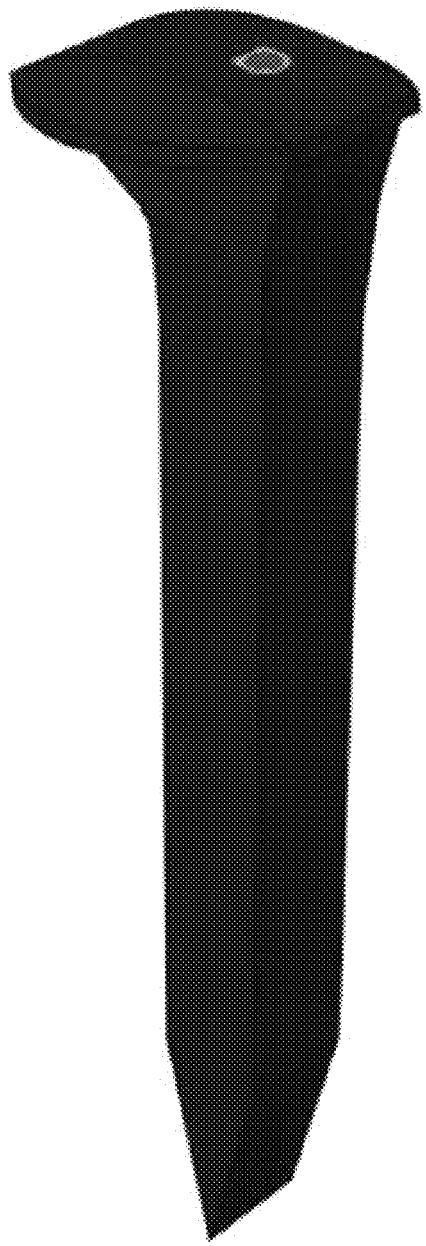
Partially cracked
FIGURE 10 (con't)

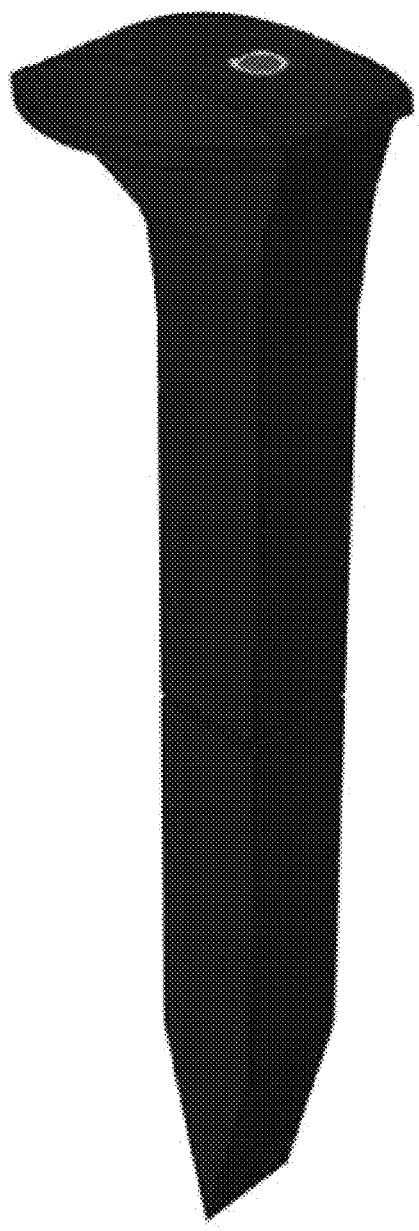
Crack at 2 in. from top
FIGURE 10 (con't)

Laser beam area $A = 1.0 \times 10^{-6} \text{ m}^2$

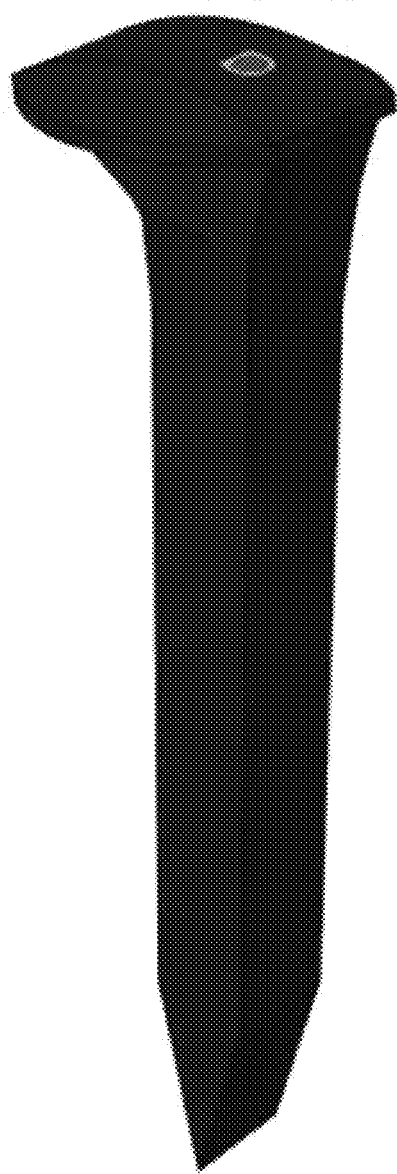
Partially cracked
FIGURE 12 (con't)

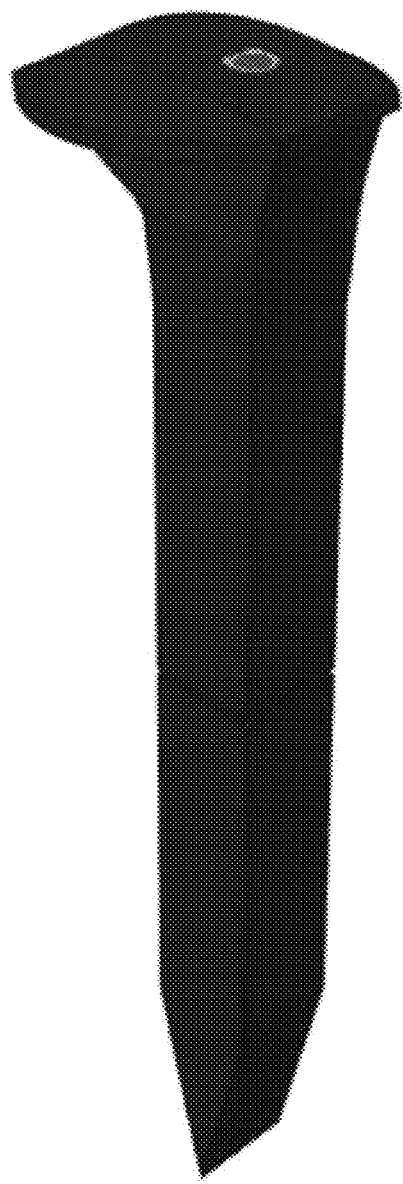
Crack at 2 in. from top
FIGURE 12 (con't)

Laser beam area $A = 2.5 \times 10^{-7}$ m$^2$

Power per pulse = $2.0 \times 10^6$ W

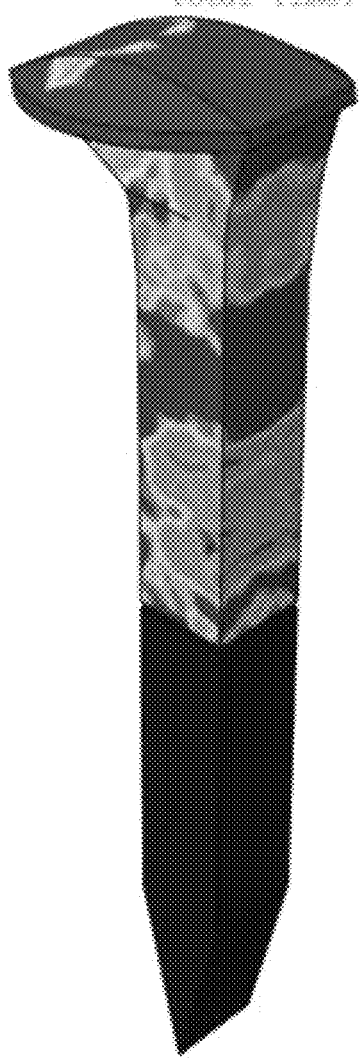
$4.0 \times 10^6$ W
FIGURE 14 (con't)

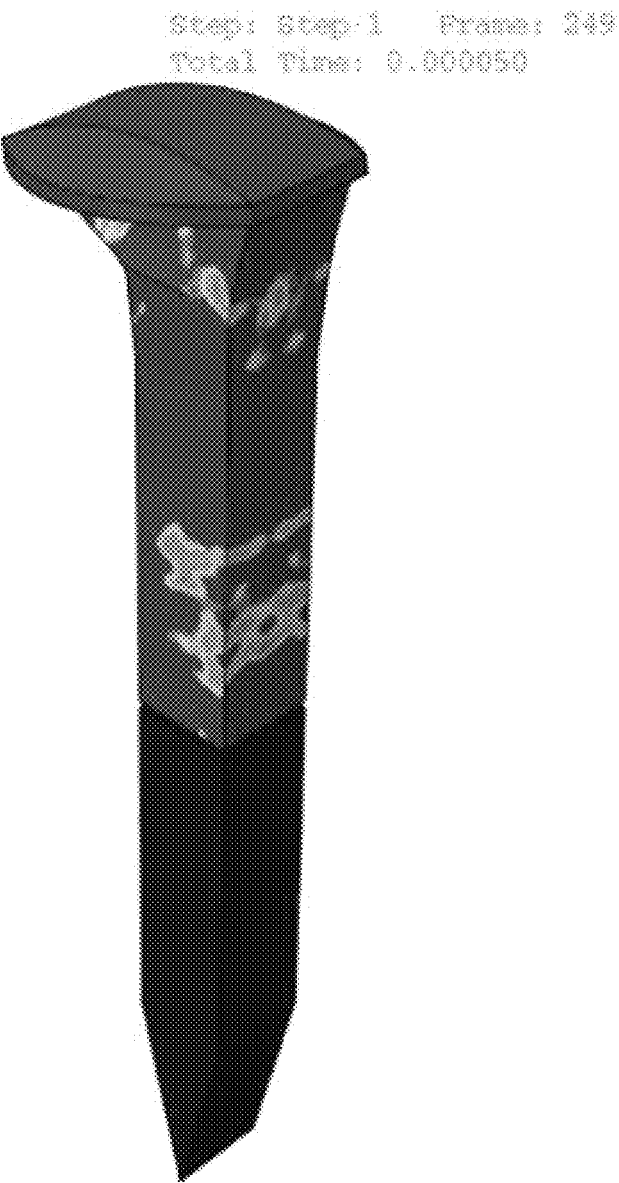
$8.0 \times 10^6$ W
FIGURE 14 (con't)

Constant laser beam area $A = 3.6 \times 10^{-5}$ m$^2$ $$A = 3.6 \times 10^{-5} \text{ m}^2$$

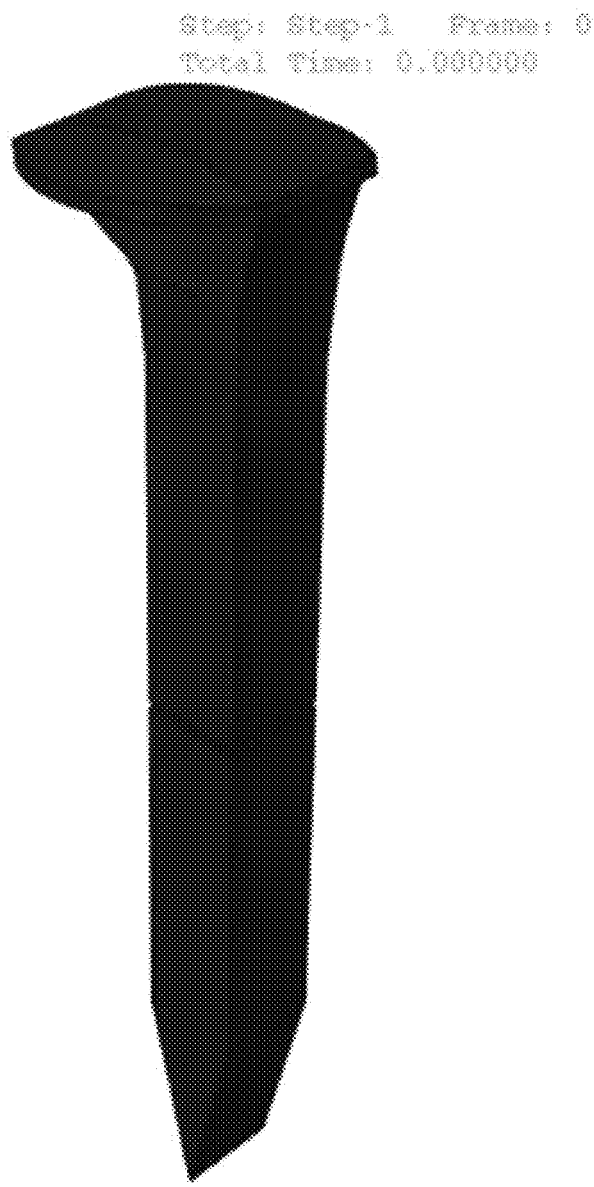
$$A = 1.8 \times 10^{-5} \text{ m}^2$$
FIGURE 16 (con't)

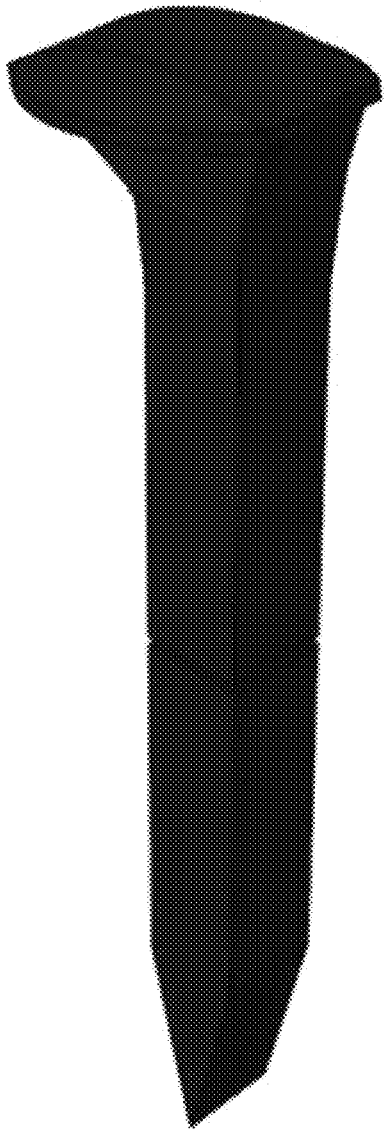
$$A = 1.8 \times 10^{-5} \text{ m}^2$$
FIGURE 16 (con't)

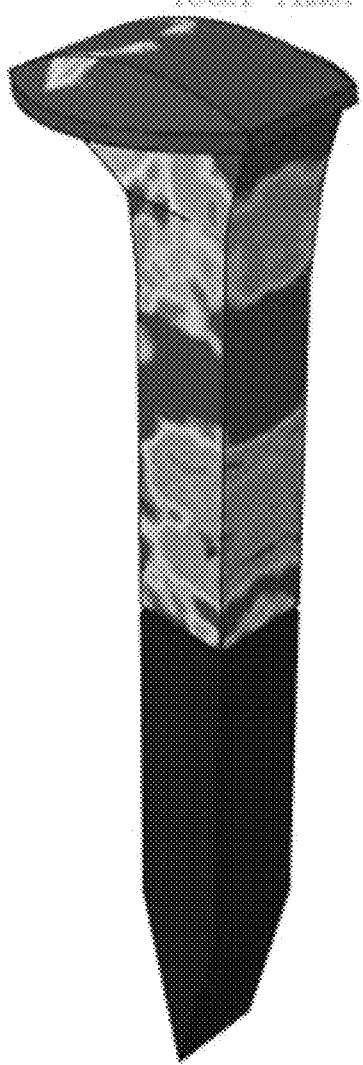
$4.0 \times 10^6$ W
FIGURE 18 (con't)

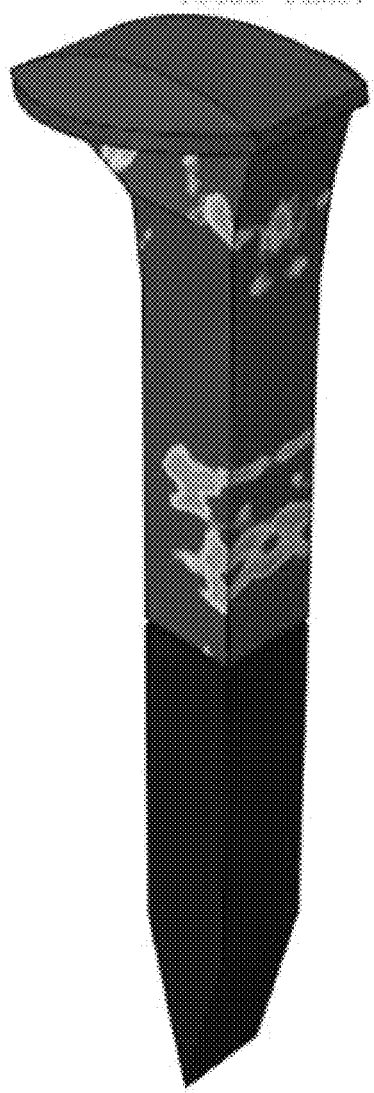
$8.0 \times 10^6$ W
FIGURE 18 (con't)

Power per pulse =
$2.0 \times 10^6$ W $4.0 \times 10^6$ W $8.0 \times 10^6$ W uncracked

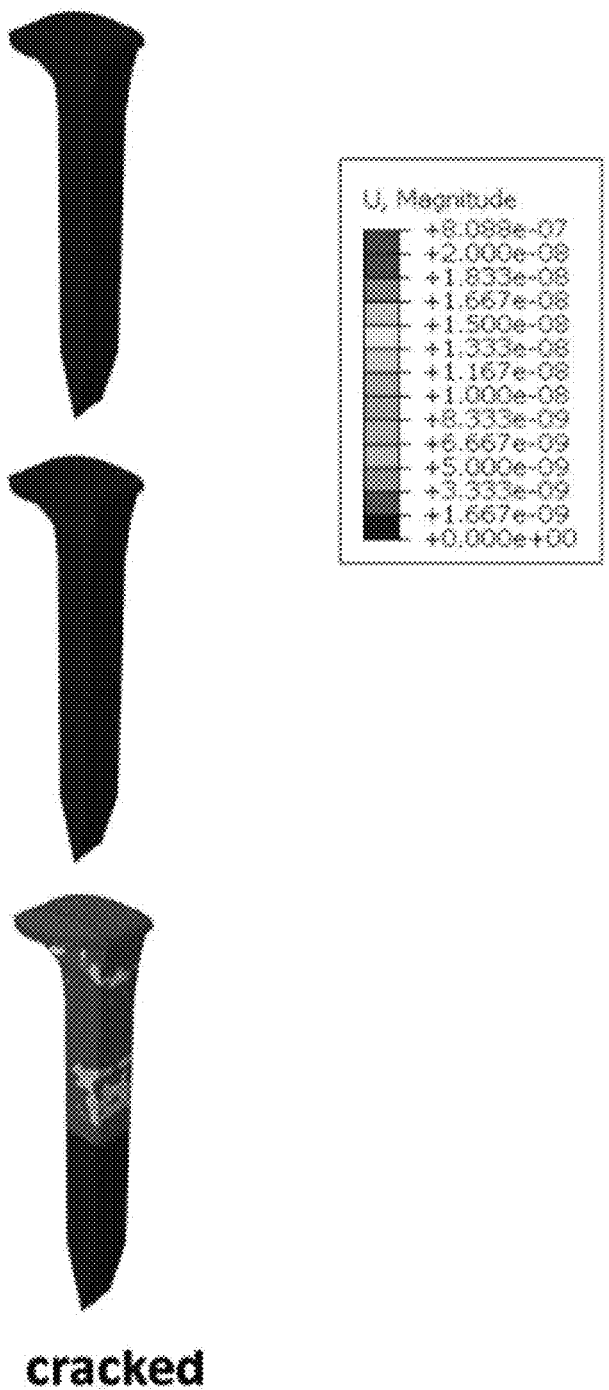
cracked
FIGURE 19 (con't)

LASER-BASED NON-DESTRUCTIVE SPIKE DEFECT INSPECTION SYSTEM

STATEMENT REGARDING FEDERALLY SPONSORED RESEARCH

This disclosure was made with government support under National Academy of Sciences Cooperative Agreement 69A36520401600RRDDC. The government may have certain rights in the disclosure.

TECHNICAL FIELD

The present disclosure relates to a low-cost, non-destructive, and contact-free intelligent inspection system that is field-deployable on a geometry car, high-rail vehicle, or other types of track inspection platforms to identify broken spikes in real-time.

BACKGROUND

Currently, railroad/railway safety inspections of spikes use to secure rails are performed manually. Railroad workers need to go to the track and pull each spike by hand to see if they are broken or loose, which is, subjective, time-consuming, and labor-intense. This system will greatly improve inspection efficiency and save inspection costs.

Accordingly, it is an object of the present disclosure to provide a low-cost, non-destructive, and contact-free intelligent inspection system that is field-deployable on a geometry car, high-rail vehicle, or other types of track inspection platforms to identify broken spikes at the real-time rate. The proposed laser aided broken spike inspection system will integrate laser excitation, acoustic analysis, computer vision and pattern recognition, and artificial intelligence (AI) onto a deployable platform. This will significantly improve the efficiency and accuracy in spike inspection, enhance railroad track safety, and benefit all the stakeholders in industry as well as railroad administration and legislation.

SUMMARY

The above objectives are accomplished according to the present disclosure by providing in one embodiment, a method for detecting structural integrity in an object. The method may include employing a laser source to excite an object, generating an internal acoustic wave within the object due to heat flux, wherein the acoustic wave propagates within the object, receiving the acoustic wave from the object, and determining the presence or absence of a structural fault within the object based on analyzing the acoustic wave from the object. Still, the method may detect a location of the structural fault within the object. Further, the method may detect an extent of the structural fault within the object. Still yet, the object may be a railroad spike or screw. Again, the railroad spike or screw may be analyzed while remaining in place on a railway. Further again, the method may employ computer vision to locate the object for analysis. Still moreover, the method may employ pattern recognition to determine the absence or presence of a structural defect in the object. Yet further, the method may include using an artificial intelligence module to determine the absence or presence of a structural defect in the object. Furthermore, the method may generate longitudinal, shear and/or Rayleigh waves with a single laser pulse within the object. Yet again, the method may include comparing the analyzed acoustic wave from the object to a library of structural defects to provide onsite determination of the presence or absence of a structural defect.

In a further embodiment, a method of non-destructive and contact-free structural integrity inspection is provided. The method may include recognizing an object for structural analysis, determining a location on the object to activate laser excitation, employing a laser source to excite an object; generating an internal acoustic wave within the object due to heat flux, wherein the acoustic wave propagates within the object; receiving the acoustic wave from the object; and determining the presence or absence of a structural fault within the object based on analyzing the acoustic wave from the object. Further, the method may detect a location of the structural fault within the object. Still, the method may detect an extent of the structural fault within the object. Yet still, the object may be a railroad spike or screw. Moreover, the railroad spike or screw may be analyzed while remaining in place on a railway. Still again, the method may include employing computer vision to locate the object for analysis. Further yet, the method may include employing pattern recognition to determine the absence or presence of a structural defect in the object. Still moreover, the method may use artificial intelligence module to determine the absence or presence of a structural defect in the object. Yet further, the method may generate longitudinal, shear and/or Rayleigh waves with a single laser pulse within the object. Moreover, the method may compare the analyzed acoustic wave from the object to a library of structural defects to provide onsite determination of the presence or absence of a structural defect.

These and other aspects, objects, features, and advantages of the example embodiments will become apparent to those having ordinary skill in the art upon consideration of the following detailed description of example embodiments.

BRIEF DESCRIPTION OF THE DRAWINGS

An understanding of the features and advantages of the present disclosure will be obtained by reference to the following detailed description that sets forth illustrative embodiments, in which the principles of the disclosure may be utilized, and the accompanying drawings of which.

Figure 1:
FIG. 1 shows photos of field observed broken spikes.
Figure 1:

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art. Such objects, features, benefits and advantages will be apparent from the above in conjunction with the accompanying examples, data, figures and all reasonable inferences to be drawn therefrom, alone or with consideration of the references incorporated herein.

DETAILED DESCRIPTION OF A PREFERRED EMBODIMENT

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant application should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Where a range is expressed, a further embodiment includes from the one particular value and/or to the other particular value. The recitation of numerical ranges by endpoints includes all numbers and fractions subsumed within the respective ranges, as well as the recited endpoints. Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the singular forms "a", "an", and "the" include both singular and plural referents unless the context clearly dictates otherwise.

As used herein, "about," "approximately," "substantially," and the like, when used in connection with a measurable variable such as a parameter, an amount, a temporal duration, and the like, are meant to encompass variations of and from the specified value including those within experimental error (which can be determined by e.g. given data set, art accepted standard, and/or with e.g. a given confidence interval (e.g. 90%, 95%, or more confidence interval from the mean), such as variations of +/−10% or less, +/−5% or less, +/−1% or less, and +/−0.1% or less of and from the specified value, insofar such variations are appropriate to perform in the disclosure. As used herein, the terms "about," "approximate," "at or about," and "substantially" can mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

The term "optional" or "optionally" means that the subsequent described event, circumstance or substituent may or may not occur, and that the description includes instances where the event or circumstance occurs and instances where it does not.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s). Reference throughout this specification to "one embodiment", "an embodiment," "an example embodiment," means that a particular feature, structure or characteristic described in connection with the embodiment is included in at least one embodiment of the present disclosure. Thus, appearances of the phrases "in one embodiment," "in an embodiment," or "an example embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the disclosure. For example, in the appended claims, any of the claimed embodiments can be used in any combination.

All patents, patent applications, published applications, and publications, databases, websites and other published materials cited herein are hereby incorporated by reference to the same extent as though each individual publication, published patent document, or patent application was specifically and individually indicated as being incorporated by reference.

In one aspect, the current disclosure provides a laser device to send an impulse to a railroad spike head to excite the spike to generate an internal wave inside the spike due to heat flux. The internal wave will propagate inside the spike and reflect back whenever the boundary is reached. If there is a crack, fully or partially, the reflection will be different. The current disclosure can measure the acoustic emission from the spike head to distinguish between no crack and cracked cases. This will be a non-destructive inspection method for spike crack detection. Potentially, it can also detect the crack location and crack percentage based on the difference in signals that emanate from the excited spike. At essence, the concept includes hitting the spike with a laser impulse and then listening to the generated sound. A cracked spike and non-cracked spike will have different sounds, which can help determine which one is cracked and which one is not cracked.

Broken spikes are observed frequently, including cut spikes, screw spikes, and driven spikes used to restrict both tie plates and rails. Since cracks in the various types of securement spikes are typically underneath the spike head, it is very difficult to distinguish the broken spikes without a direct, physical inspection, which raises great challenges in track health evaluation and operation safety. Several recent derailments in Canada and the United States are attributed to a large number of broken spikes or screws within a certain section of track.

Although many new types of elastic fasteners and concrete ties have been introduced recently, cut spikes (referred as "spike" or "spikes" hereafter) together with tie plates and timber ties are the dominant track components in North America freight railroads. For centuries, spikes, with marginal changes in terms of geometry and material, have been consistently providing reliable restrictions to rails. Spikes have also been used to fix tie plates to the timber or composite ties when elastic fasteners are used to restrain the rail. With the increasing axle load and operational speed, spikes are subjected to more demanding loading conditions, especially in the territories where tracks have high curvature. It is reported that broken spikes were observed frequently, including cut spikes, screw spikes, and driven spikes that were used to restrict both tie plates and rails. Since the cracks are typically underneath the spike head, it is very difficult to distinguish the broken spikes without physical examination, which causes formidable challenges in track health evaluation and operational safety. Several recent derailments in Canada and the United States are attributed to a large number of broken spikes or screws within a certain section of track (TSBC 2012, FRA 2016, Kerchof 2017). FIG. 1 presents photos of observed broken spikes.

Traditional track inspection methods can hardly identify any broken spikes without manually pulling each spike out, which is not practical at all. Recent developments in artificial intelligence and computer vision have greatly improved the track inspection in terms of detection of missing spikes. However, broken spikes that remain in the position cannot be recognized successfully with the current technology available in the market. Considering the enormous number of spikes in service, the serious consequences of unrecognized broken spikes, and the challenge to quantify the service condition of the spikes, it is urgent to develop a practical yet economical solution to facilitate efficient and accurate inspection tailored for spikes in the track. To address such an urgent need, we propose to develop the intelligent laser-based non-destructive spike defect inspection system based on laser excitation, acoustic analysis, computer vision and pattern recognition, and artificial intelligence (AI). The proposed system features salient non-destructive and contact-free inspection, AI innovation, and in-situ pattern training integrated onto a single system that is field-deployable in a geometry car, high-rail vehicle, or other types of track inspection platform to facilitate continuous, highly efficient and accurate spike evaluation.

Figure 2:
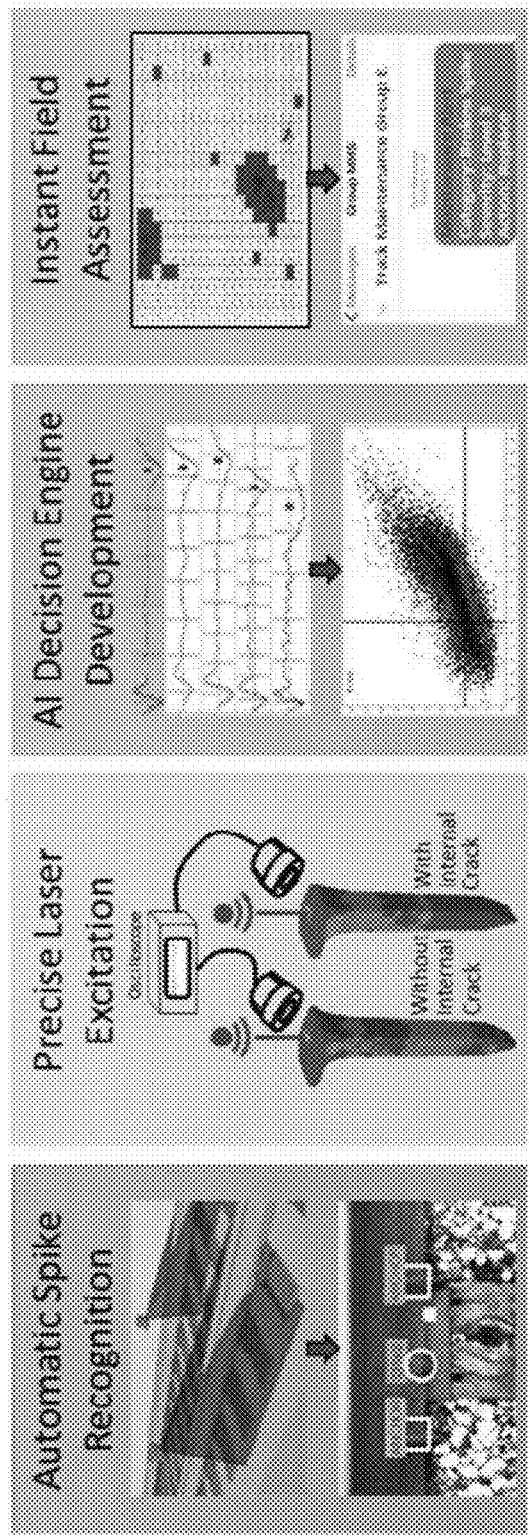
FIG. 2 displays the concept of the current disclosure.

FIG. 2 below illustrates the concept of the proposed system. It consists of three key modules: Module I: Spike Recognition; Module II: Laser Excitation and Acoustic Analysis; and Module III: Self-learning AI & Database Development.

Module I: Spike Recognition

Figure 3:
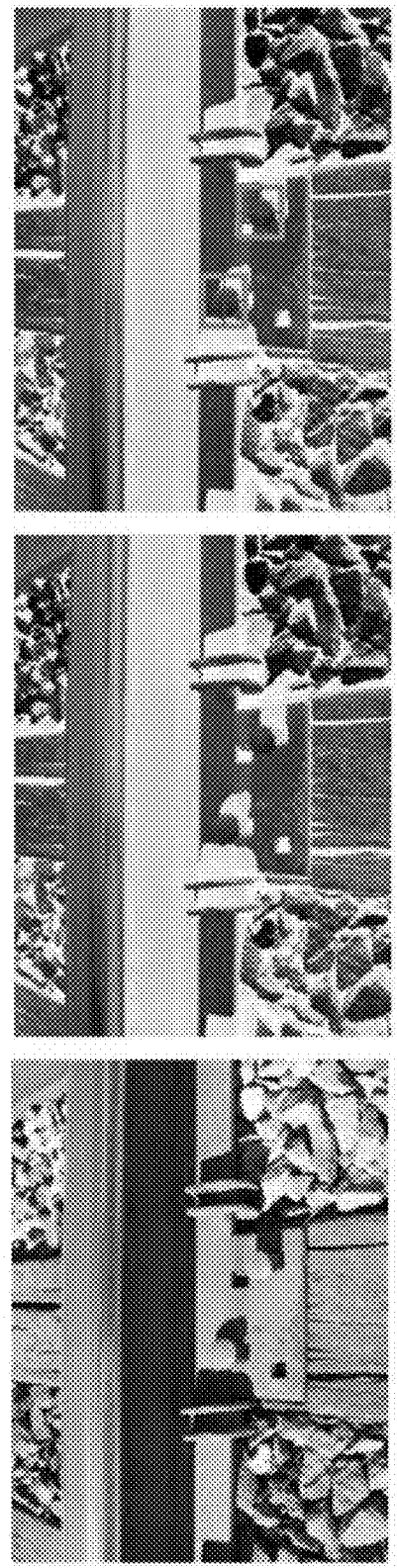
FIG. 3 shows a demonstration of spike recognition and locking.

This module is primarily used to recognize spikes in the field and locate the exact position to activate the laser excitation. The automatic target detection (ATR) of moving objects is a mature technique and has been utilized in various material processing and traffic monitoring systems. The approach we have developed is based on the change detection/frame difference, which includes frame differencing, adaptive background modeling, and statistical background modeling. We adapted algorithms and software products that developed for traffic moving objectives and tailored them towards spike recognition. FIG. 3 illustrates the preliminary results of using an ATR tool to identify spikes through computer vision and AI. This module can also detect and provide visual evidence of any missing spikes or abnormal assembly in the field indicative of a defect. In the case of missing spikes or abnormal appearance of spikes and tie plates, a defect will be recorded and laser excitation examination is not necessary.

Module II: Laser Excitation and Acoustic Analysis

Figure 4:
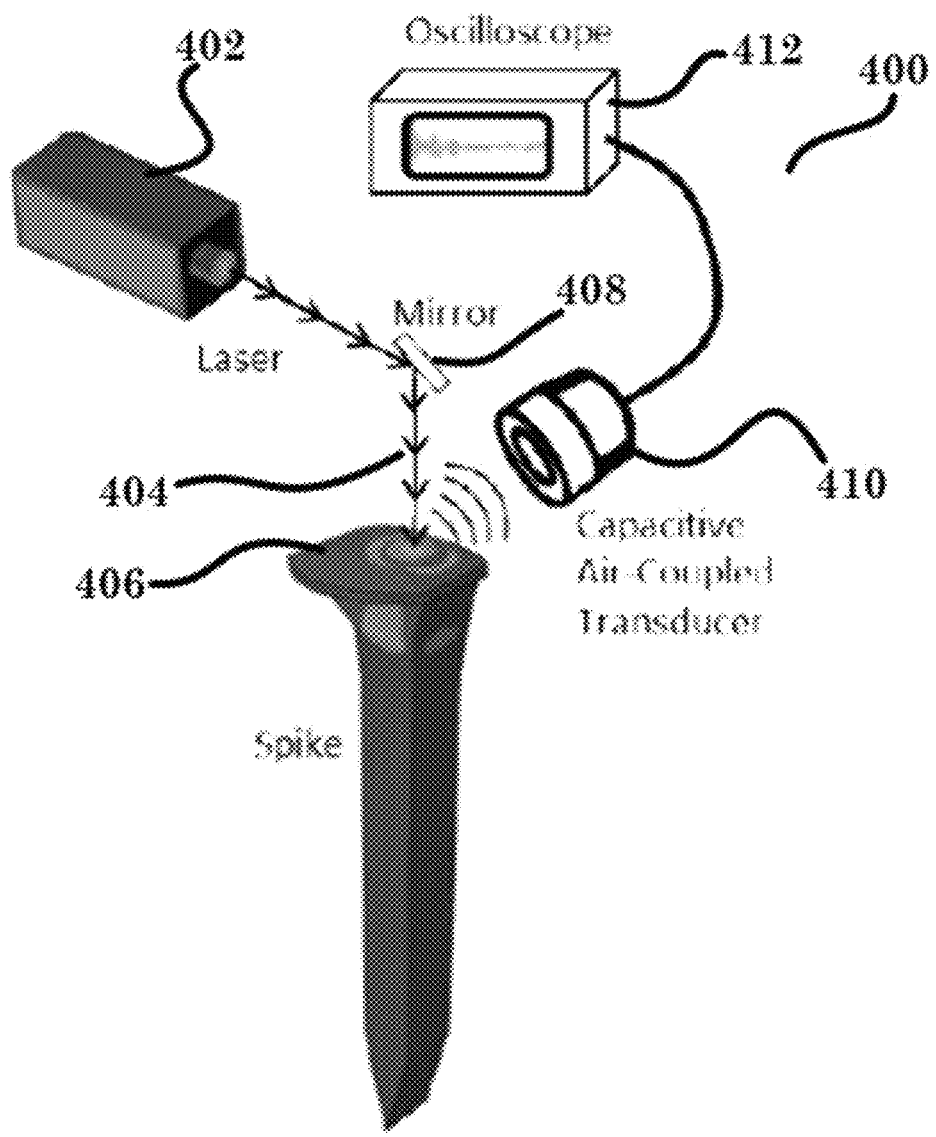
FIG. 4 shows a schematic of the proposed laser-air hybrid detection system.

Laser-air hybrid ultrasonic technique is a unique nondestructive, non-contacting, high-speed inspection system which has been practically used as a damage detection technique. Laser-air hybrid ultrasonic technique has been successfully exploited by investigators to detect cracks/flaws at different locations and orientations in rails. A schematic of the typical laser-air hybrid ultrasonic detection system 400 is shown in FIG. 4. At least one laser 402 generates acoustic waves in materials by generating point/line-focused laser beams 404. The pulse energy is applied to outer surface 406 of structural member, such a railway spike, bolt, railway tie, rail, I-beam, screw, bolt head, rebar, etc., through at least one mirror 408 and a beam steering assembly, not shown. The main advantages of using laser ultrasonic beams in the proposed effort are: (i) Generating longitudinal, shear and Rayleigh waves with a single pulse through a non-contact operation which are extremely useful in detecting internal cracks, (ii) Capable of producing an extremely small source dimension which practically can be originated from the small top surface of the spike, and (iii) Broad signal bandwidth. Since the waves can travel with small reflectivity from a high-density medium to a low-density medium, in the laser-air hybrid ultrasonic technique, the reflected ultrasonic waves are received by at least one capacitive air-coupled transducer 410 in communication with an oscilloscope 412.

The unique characteristics of the air-coupled transducers are: (i) capable of accurate detection of acoustic waves at a standoff distance from the surface, (ii) easy to use due to operating at remote distances and (iii) effectively detecting frequencies up to 2 MHz. One of the main advantages of the Laser-air hybrid ultrasonic techniques over traditional non-destructive evaluation (NDE) methods is their capability to detect cracks at relatively high inspection speeds. The experimental studies will be verified by the finite element modeling of the spike using a dynamic explicit, coupled temperature-displacement analysis in ABAQUS software.

Module III: Self-Learning AI & Database Development

Similar to pile foundation inspection, the principle of broken spike detection is based on wave propagation and reflection at the crack interface of a continuum medium (e.g., concrete or steel). A traditional pile inspection or similar techniques have two separate stages: excitation and data analysis for each test. Due to a variety of factors that can contribute to the wave propagation and reflection, such as material properties, initial stress state, ambient temperature, crack location and severity, etc., data is processed for each individual test.

The current disclosure proposes integrating an adaptive self-learning AI module, which enables on-site decision making to accurately quantify crack depth and severity for each inspected spike without time-consuming post processing and predefined threshold. With the increasing inspected spike database, the accuracy will improve as the inspection samples growing.

Figure 5:
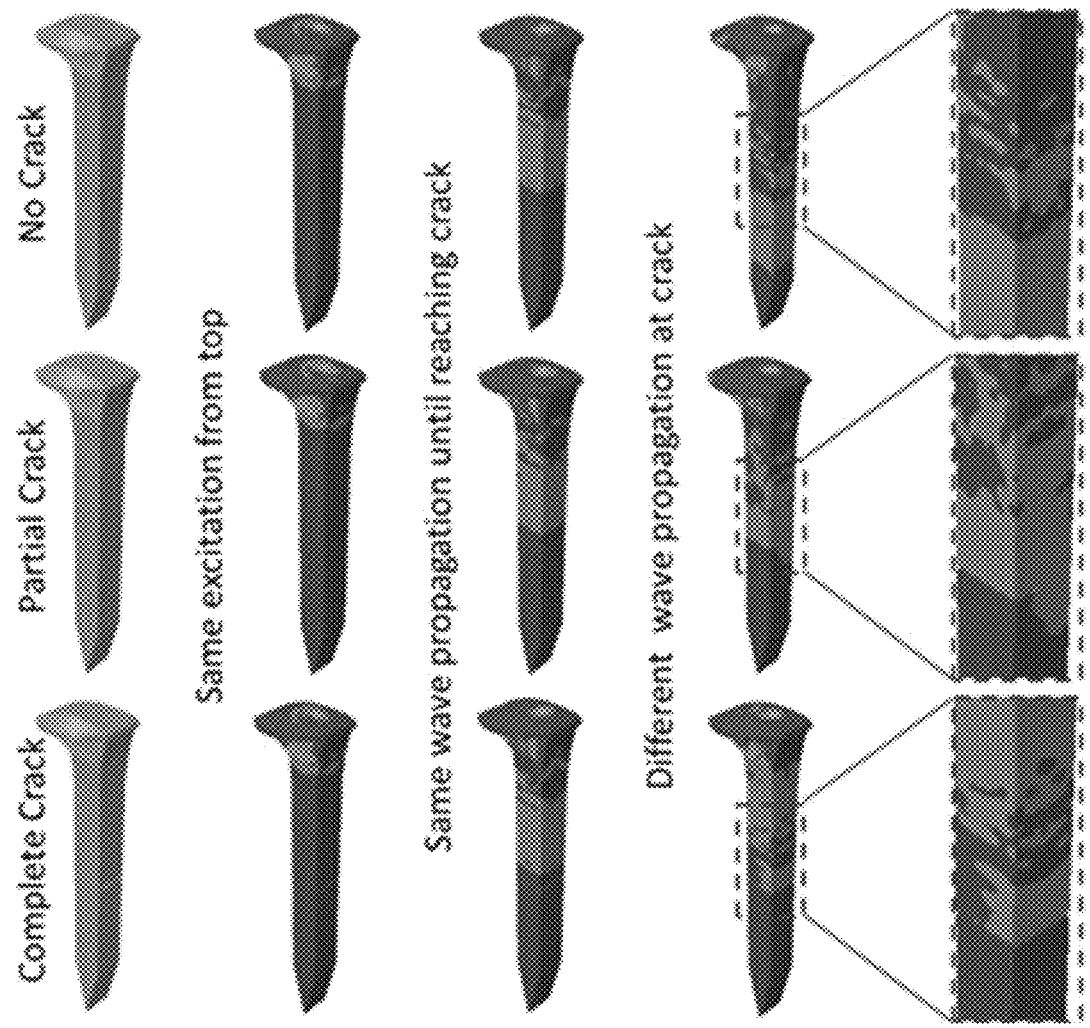
FIG. 5 shows preliminary simulation results of the proposed approach.

The developed AI can be implemented onto a mobile computing platform that can be combined with databases collected from other sections of track or integrated into a geometry car or similar platforms. Preliminary work is shown in FIG. 5. This approach is very promising in terms of distinguishing spikes in different conditions (no crack, partially cracked or effective cross-section area changed, and completely cracked/broken) from the wave signals.

It is anticipated that an AI enabled, low-cost, field-deployable Intelligent Laser-based Non-destructive Spike Defect Inspection System will be developed. Instead of using a sledgehammer to manually inspect every spike along the track, which is the current practice, the current disclosure will develop a calibrated system that can be mounted in the existing track inspection platforms and automatically detect any missing spike via using a laser to pulse each existing spike. The reflected acoustic signal would be used to evaluate the health condition of each spike in the field. Furthermore, in order to increase the inspection efficiency, instead of the traditional inspection approach, which needs sophisticated post-processing of the collected data, this proposed approach can develop a AI engine and a "standard library" to facilitate instant onsite decision. This would enable to obtain the real-time spike health condition as the inspection platform pass each spike.

The proposed system will serve as an unprecedented component to the next-generation, smart track inspection system, and hence, will significantly reduce inspection cost and derailment risk, optimize maintenance strategy, and improve track safety.

Task 1: Comprehensive Literature Review

A comprehensive literature review for late-breaking research that can potentially enhance the proposed development will be performed, in particular, on AI-guided track inspection and broken spike research. The research team will also interview railroads, suppliers, and research institutes from the U.S. and other countries, like Japan, to gain deep insight into the current practices and identify/summarize different technologies or products relevant to this research.

Task 2: Laser Excitation and Acoustic Analysis of Wave Propagation Inside the Spike The central thrust of this task is to conduct experimental and numerical experiments to validate the capability of the proposed inspection system in detecting internal cracks in spikes. The acoustic waves will be generated by pulsed lasers on the top surface of the spike and detected by air-coupled transducers. An extensive parametric study will be conducted to examine the sensitivity of the proposed inspection system given various parameters, such as the crack position/orientation, the air-coupled transducer stand-off distance/orientation and the pulse source type/power density through the finite element analyses. Laboratory experiments will be carried out to verify the numerical results.

Task 3: Safety Evaluation and Assurance

It is possible for laser scattering to happen at the excitation stage. This task is to evaluate the scattering from the laser and develop remedial methods to mitigate any potential harmful effect. This task will be completed in the laboratory to ensure the energy of laser light scattered is below the safety limits for human exposure.

Task 4: Automatic Spike Recognition

The current disclosure will adapt algorithms and software products developed for ATR to applications of spike recognition. An enormous amount of spike photos taken from a geometry car or similar inspection platforms provide by CSX, will be used to train an AI for recognizing spikes in the field with normal operation speed of typical inspection vehicles.

Task 5: Field Testing

Upon the completion of the previous tasks, the research team will assemble a prototype inspection system at the selected mainline track provided by the industry partner, CSX, or other railroad that are interested in this system to test, validate, and demonstrate the system in the field.

Task 6: Development of AI Decision Engine and Database

An adaptive AI will be developed based on the inspection result database from task 3 and 5 to enables on-site decision making to quantify crack depth and severity for each inspected spike.

Traditional track inspection methods can hardly identify any broken spikes without manually pulling each spike out, which is not practical at all. Recent developments in artificial intelligence and computer vision have greatly improved the track inspection in terms of detection of missing spikes. However, broken spikes that remain in position cannot be recognized successfully with the current technology available in the market. Considering the enormous number of spikes in service, the serious consequences of unrecognized broken spikes, and the challenge to quantify the service condition of the spikes, it is urgent to develop a practical yet economical solution to facilitate efficient and accurate inspection tailored for spikes in the track.

To address such an urgent need, the current disclosure proposes an Intelligent Laser Aided Broken Spike Inspection System (i-LABSIS) based on laser excitation, acoustic analysis, computer vision and pattern recognition, and artificial intelligence (AI). i-LABSIS features salient non-destructive and contact-free inspection, AI innovation, and in-situ pattern training integrated onto a single system that is field-deployable in a geometry car, high-rail vehicle, or other types of track inspection platform to facilitate continuous, highly efficient and accurate spike condition evaluation.

An AI enabled, low-cost, field-deployable Intelligent Laser Aided Broken Spike Inspection System (i-LABSIS) will be developed. i-LABSIS will serve as an unprecedented component to the next-generation, smart track inspection system, and hence, will significantly reduce derailment risk, optimize maintenance strategy, and improve track safety. The current disclosure may provide a non-destructive, contact free analysis via laser excitation. The system may be mobile, such as a geometry car or other vehicle. In situ AI and a Neural Network Engine may be employed to provide automated data processing for instant spike condition decisions as well as to adapt to particular/individual track segments via machine learning. Further, convenient data management may be provided via a development inspection database and AI loaded in a portable chip, which may be exchangeable with different devices. Further, the system may provide data-drive performance prediction via condition based inspection scheduling.

EXAMPLES

Now having described the embodiments of the present disclosure, in general, the following Examples describe some additional embodiments of the present disclosure. While embodiments of the present disclosure are described in connection with the following examples and the corresponding text and figures, there is no intent to limit embodiments of the present disclosure to this description. On the contrary, the intent is to cover all alternatives, modifications, and equivalents included within the spirit and scope of embodiments of the present disclosure. The following examples are put forth so as to provide those of ordinary skill in the art with a complete disclosure and description of how to perform the methods and use the probes disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Parameters

Figure 6:
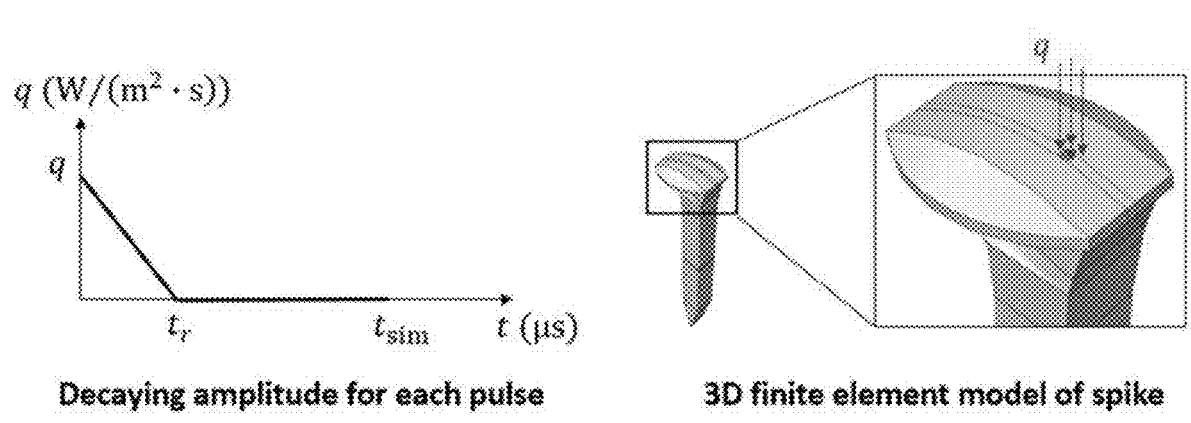
FIG. 6 shows simulation information including pulse amplitude and a 3-D model of a railway spike.

Measurements Taken Using the Power Meter with No Collimating Lenses to Focus the Beam:
1. (Minimum Measured) Energy per Pulse~$0.67 \times 10^{-3}$ J
2. (Minimum Measured) Power per Pulse=$1.12 \times 10^6$ W From the documentation on the calibration of our system
1. (Maximum Rated from Previous Calibration) Energy per Pulse=$1.49 \times 10^{-3}$ J
2. (Maximum Rated from Previous Calibration) Power per Pulse=$2.48 \times 10^6$ W Possible Repetition Rates 0.6 Hz-20 Hz (0.6 pulses per second to 20 pulses per second Information for simulation, see FIG. 6:
1. Pulse Width $t_r=1.0 \times 10^{-6}$ s=1.0 µs, $t_{sim}=1.0 \times 10^{-4}$ s=100 µs
2. Power per Area q=$5.0 \times 10^{11}$ J/(m²·s)
3. The Area of the pulse: A=$4.0 \times 10^{-6}$ m²
4. Power per Pulse=Power per Area q*Area of the pulse A=$2.0 \times 10^6$ W FIG. 6 shows simulation information including pulse amplitude and a 3-D model of a railway spike.

Figure 7:
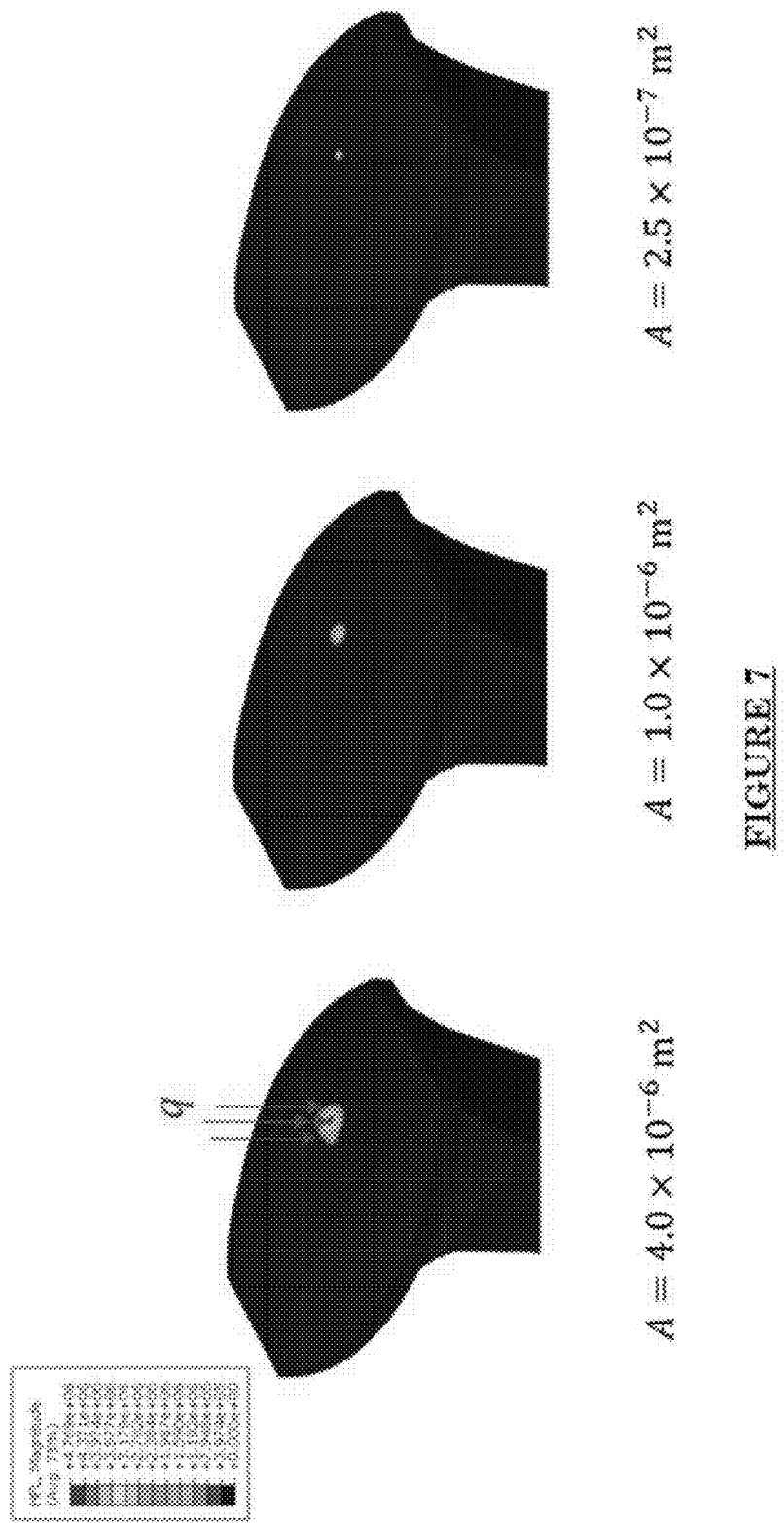
FIG. 7 shows the impact of surface heat flux on varying surface areas excited.

FIG. 7 shows the impact of surface heat flux on varying surface areas excited using a constant power per pulse=$2.0 \times 10^{-6}$ m², but varying surface area for the laser beam. Smaller the area, stronger the surface heat flux on the top of the spike.

Figure 8:
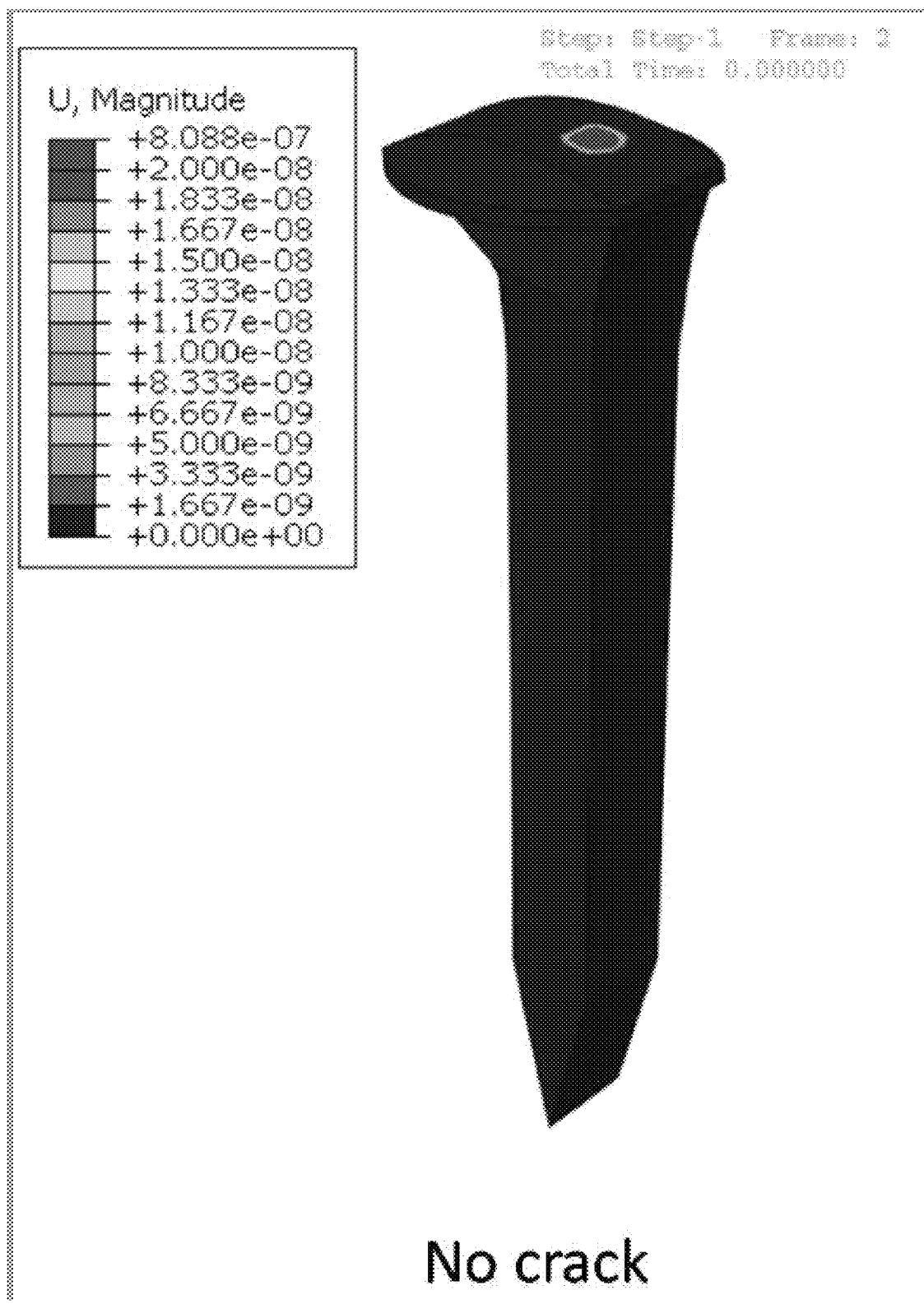
FIG. 8 shows employing a constant power per pulse with laser beam area $4.0 \times 10^{-6}$ $m^2$ on an undamaged, partially cracked, and a spike with a deep crack.

FIG. 8 shows employing a constant power per pulse with laser beam area $4.0 \times 10^{-6}$ m² on an undamaged, partially cracked, and a spike with a deep crack using a constant power per pulse=$2.0 \times 10^6$ W.

Figure 9:
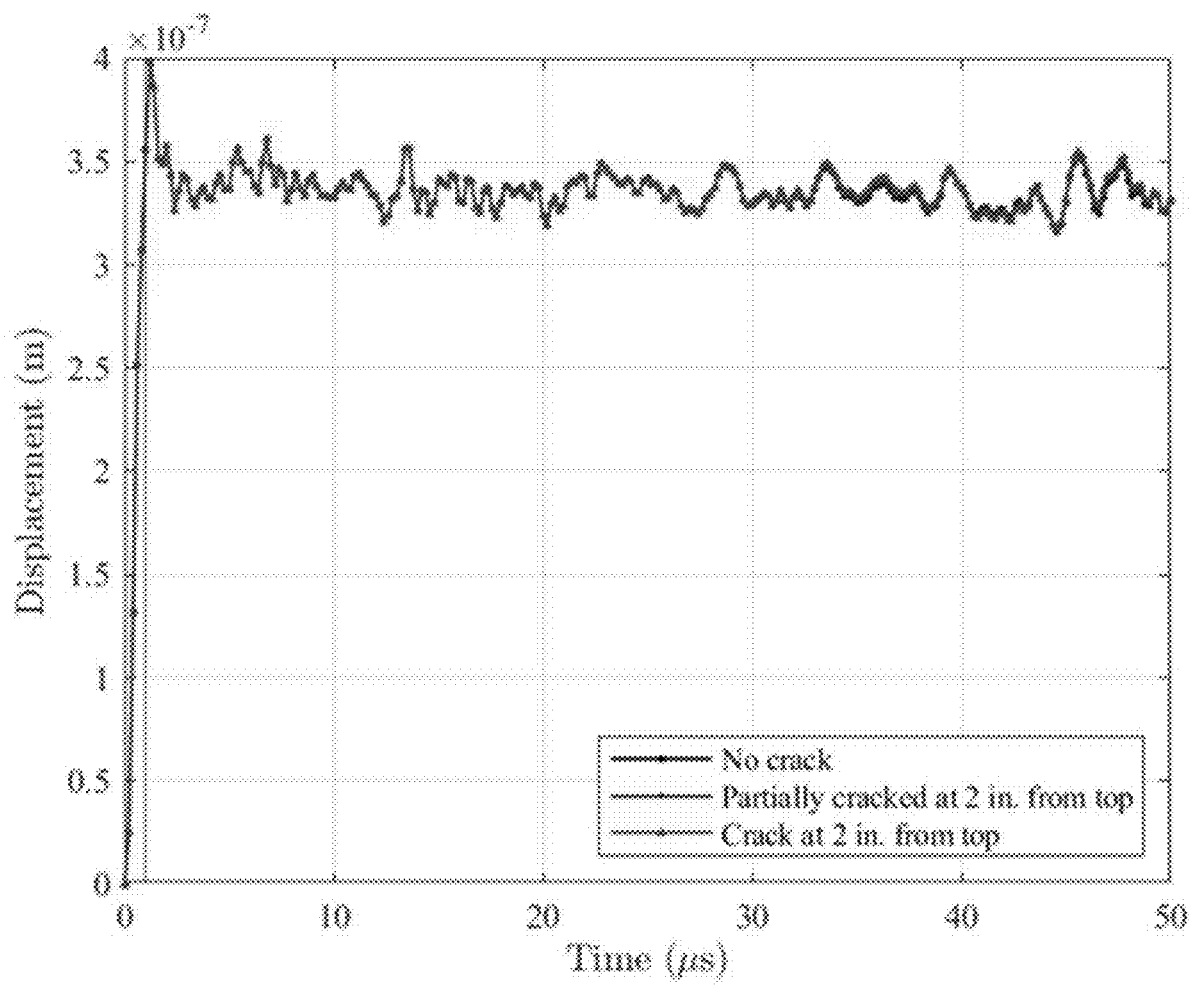
FIG. 9 shows a graph of the displacement for the spikes of FIG. 8.

FIG. 9 shows a graph of the nodal displacement history on the spike top surface for the spikes of FIG. 8 using a constant power per pulse=$2.0 \times 10^6$ W.

Figure 10:
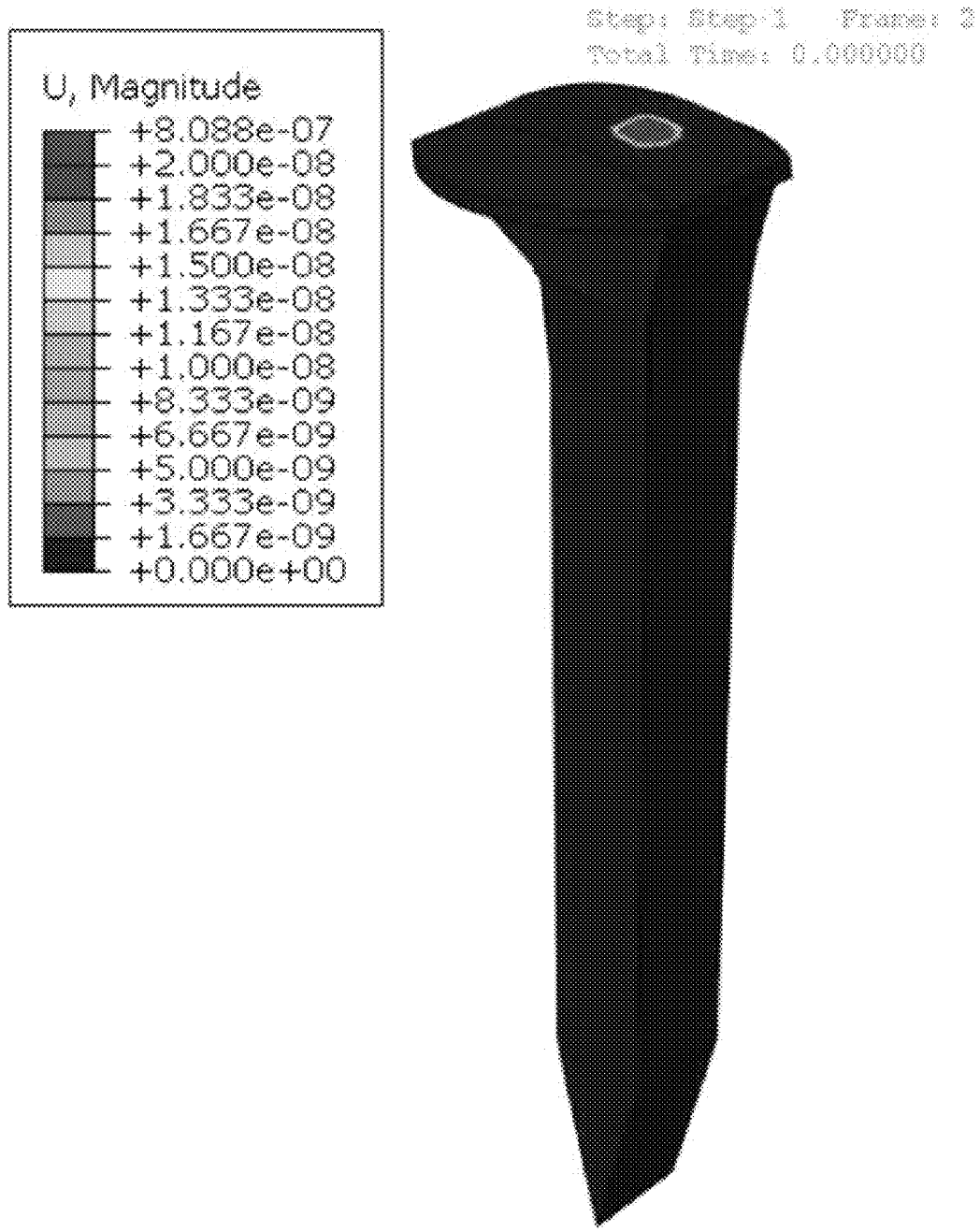
FIG. 10 shows a $1.0 \times 10^{-6}$ $m^2$ laser beam area on an undamaged, partially cracked, and a spike with a deep crack.

FIG. 10 shows a $1.0 \times 10^{-6}$ m² laser beam area on an undamaged, partially cracked, and a spike with a deep crack employing a constant power per pulse=$2.0 \times 10^6$ W.

Figure 11:
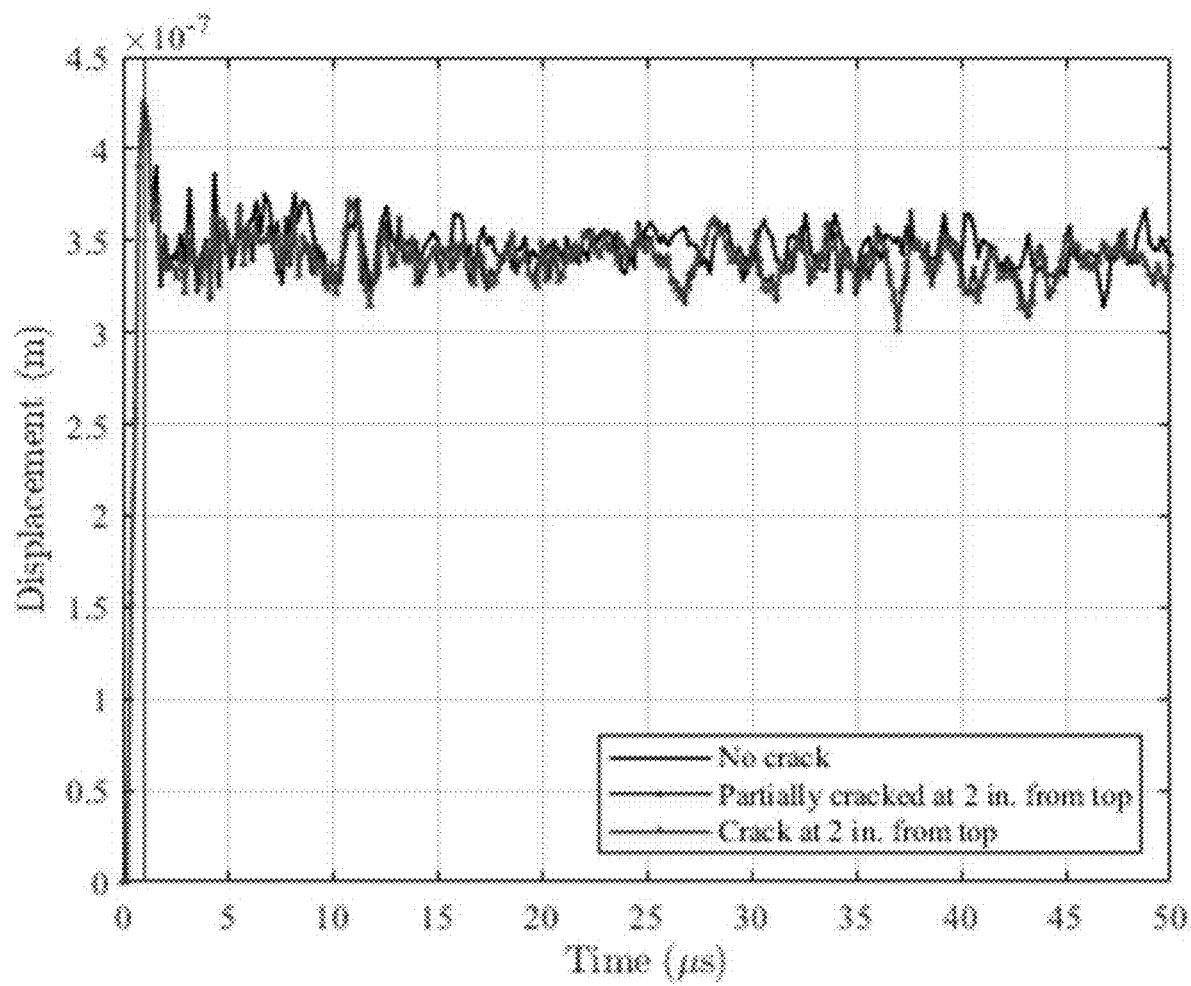
FIG. 11 shows a graph of the displacement for the spikes of FIG. 10.

FIG. 11 shows a graph of the nodal displacement history on the spike top surface for the spikes of FIG. 10 using a constant power pulse of $2.0 \times 10^6$ W.

Figure 12:
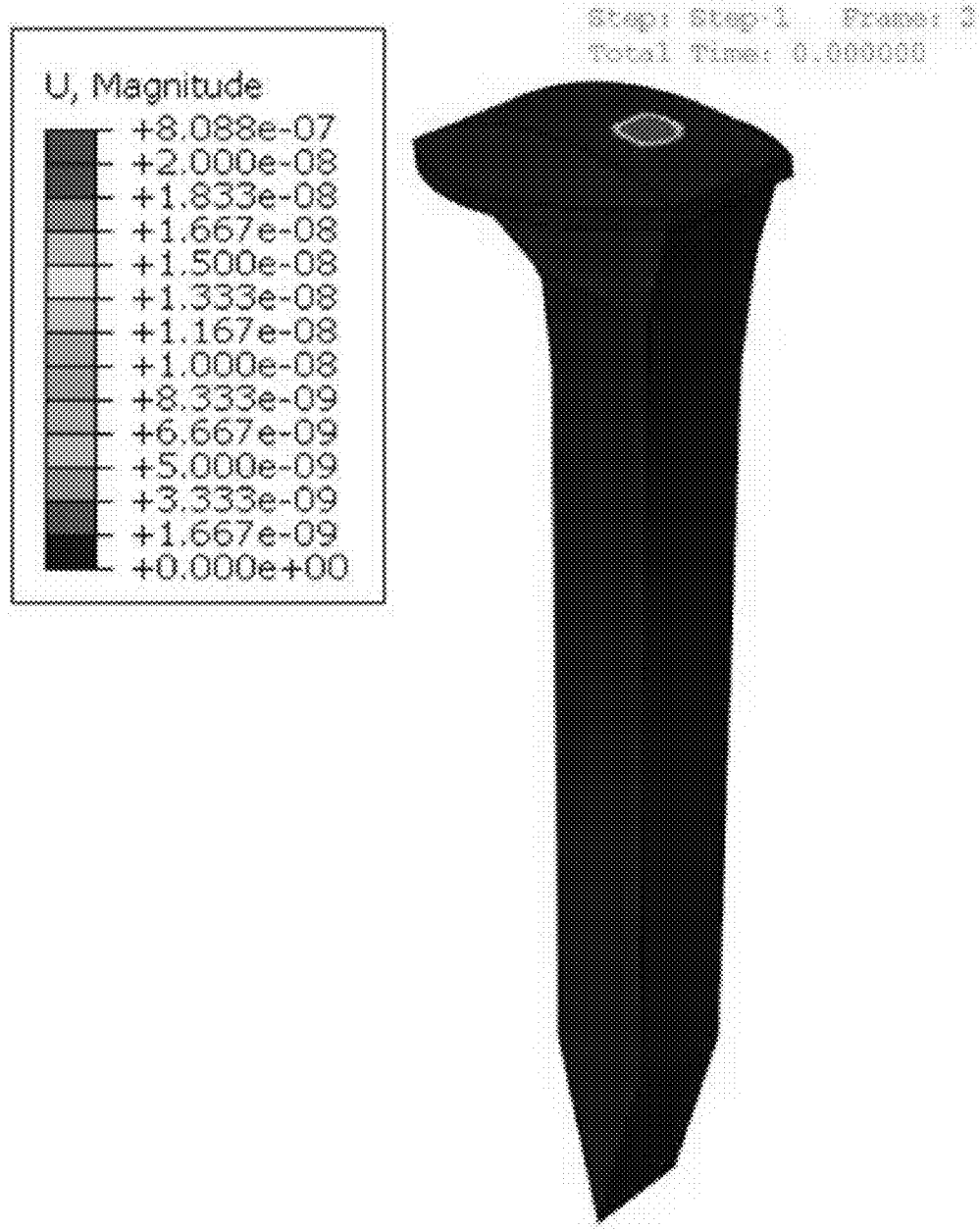
FIG. 12 shows a $2.5 \times 10^{-7}$ $m^2$ laser beam area on an undamaged, partially cracked, and a spike with a deep crack.

FIG. 12 shows a $2.5 \times 10^{-7}$ m² laser beam area on an undamaged, partially cracked, and a spike with a deep crack. Laser beam area A=$2.5 \times 10^{-7}$ m²

Figure 13:
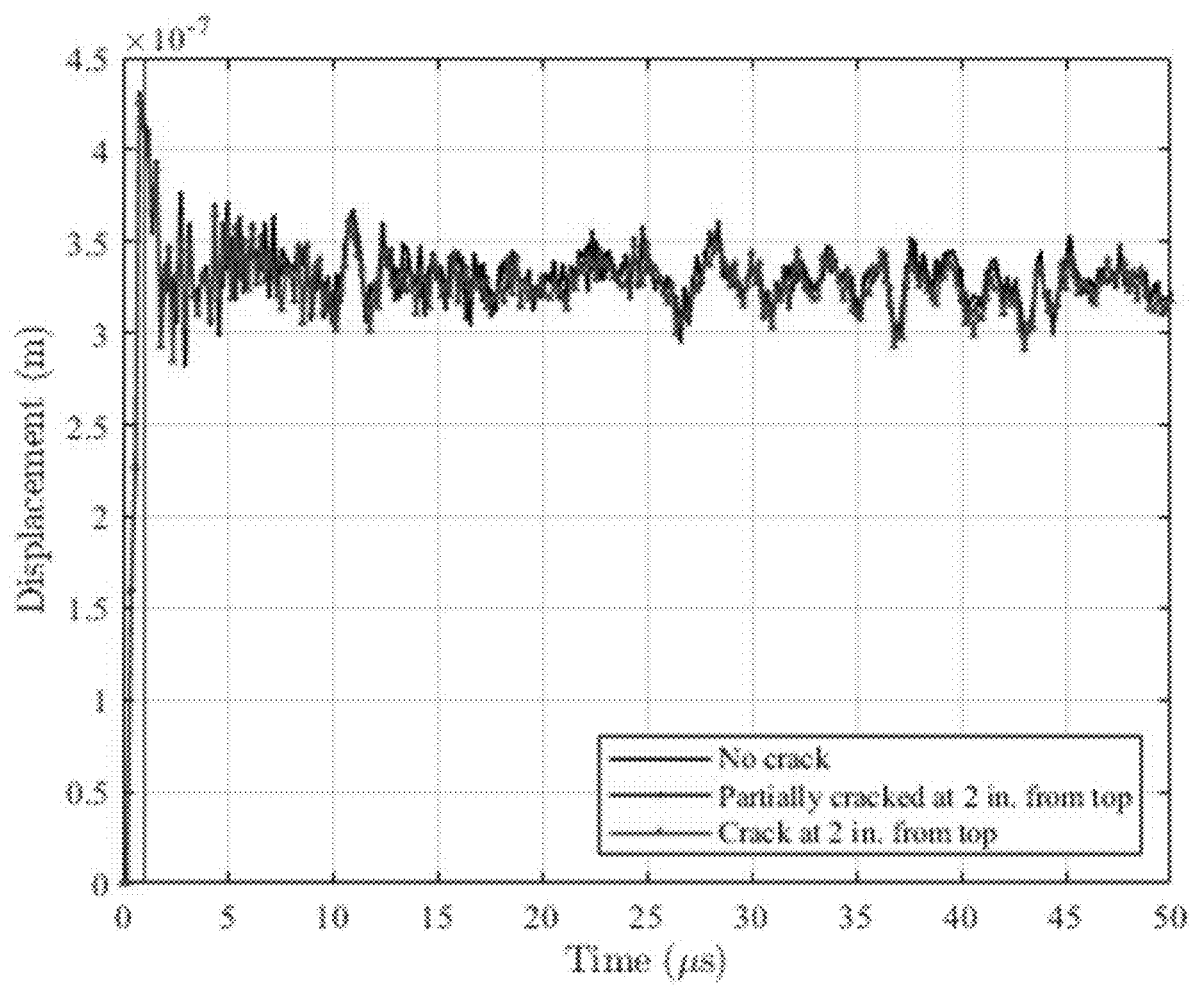
FIG. 13 shows a graph of the displacement for the spikes of FIG. 12.

FIG. 13 shows a graph of the nodal displacement history on the spike top surface for the spikes of FIG. 12, using a constant power per pulse=$2.0 \times 10^6$ W.

Figure 14:
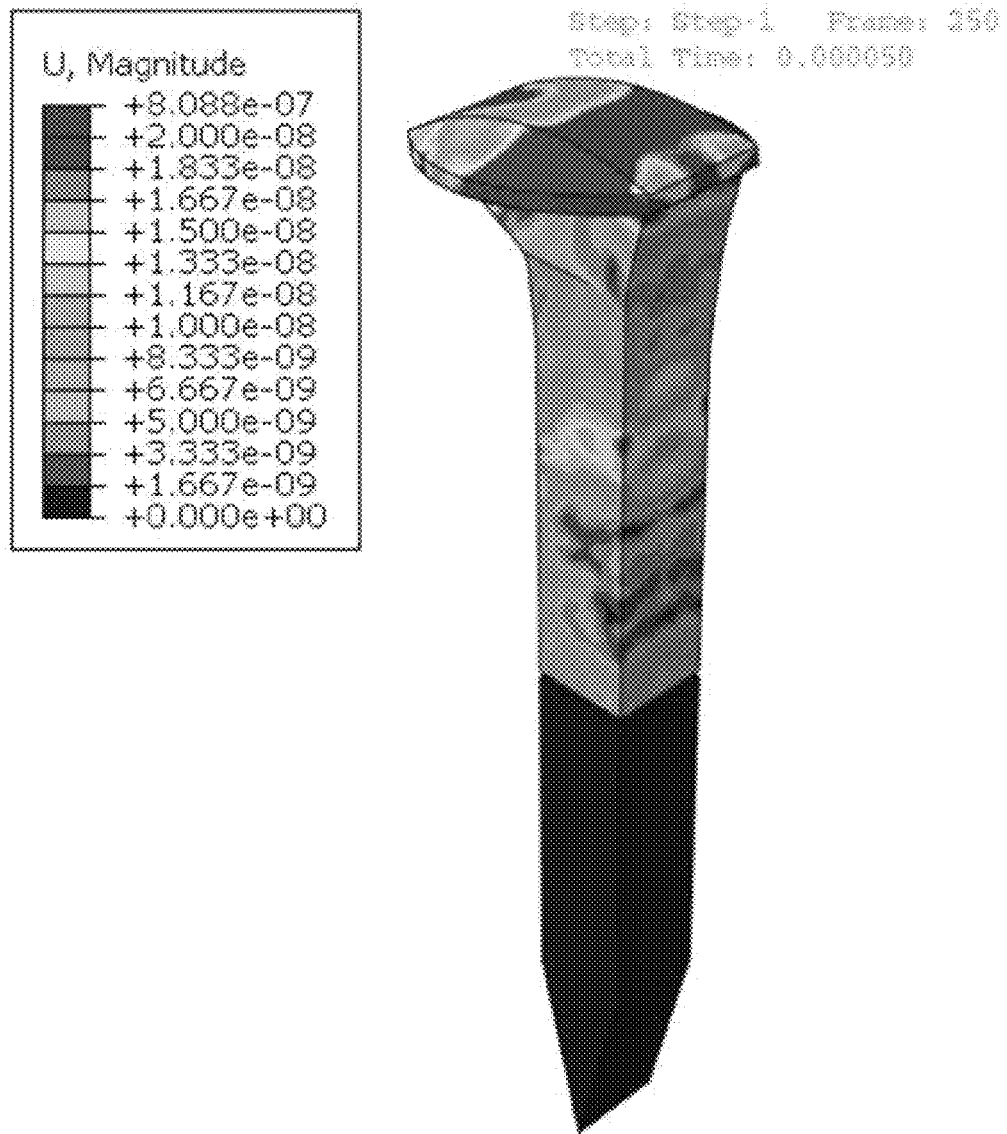
FIG. 14 shows a striped laser beam on a fully cracked spike with a constant laser beam area of $3.6\times10^{-5}$ m$^2$.

FIG. 14 shows a striped laser beam on a fully cracked spike with a constant laser beam area of $3.6 \times 10^{-5}$ m².

$$\text{Power per pulse} = \frac{2.0}{4.0} \times 10^6 W.$$

Figure 15:
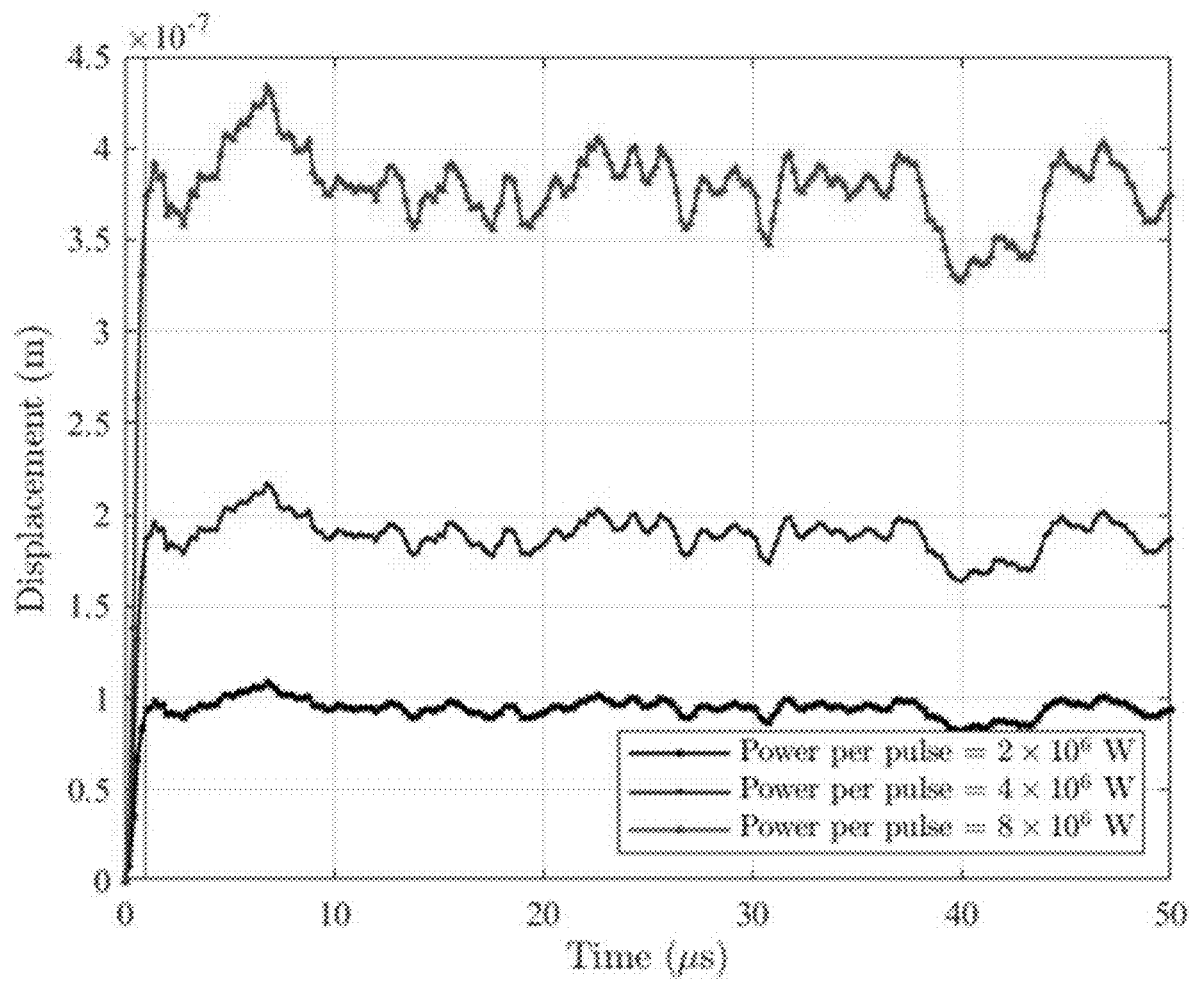
FIG. 15 shows a graph of the displacement for the spike of FIG. 14

FIG. 15 shows a graph of the nodal displacement history on the spike top surface for the spike of FIG. 14: Striped laser beam area–Fully cracked spike with a constant laser beam area A=$3.6 \times 10^{-5}$ m². Power per pulse=$2.0/4.0/8.0 \times 10^6$ W.

Figure 16:
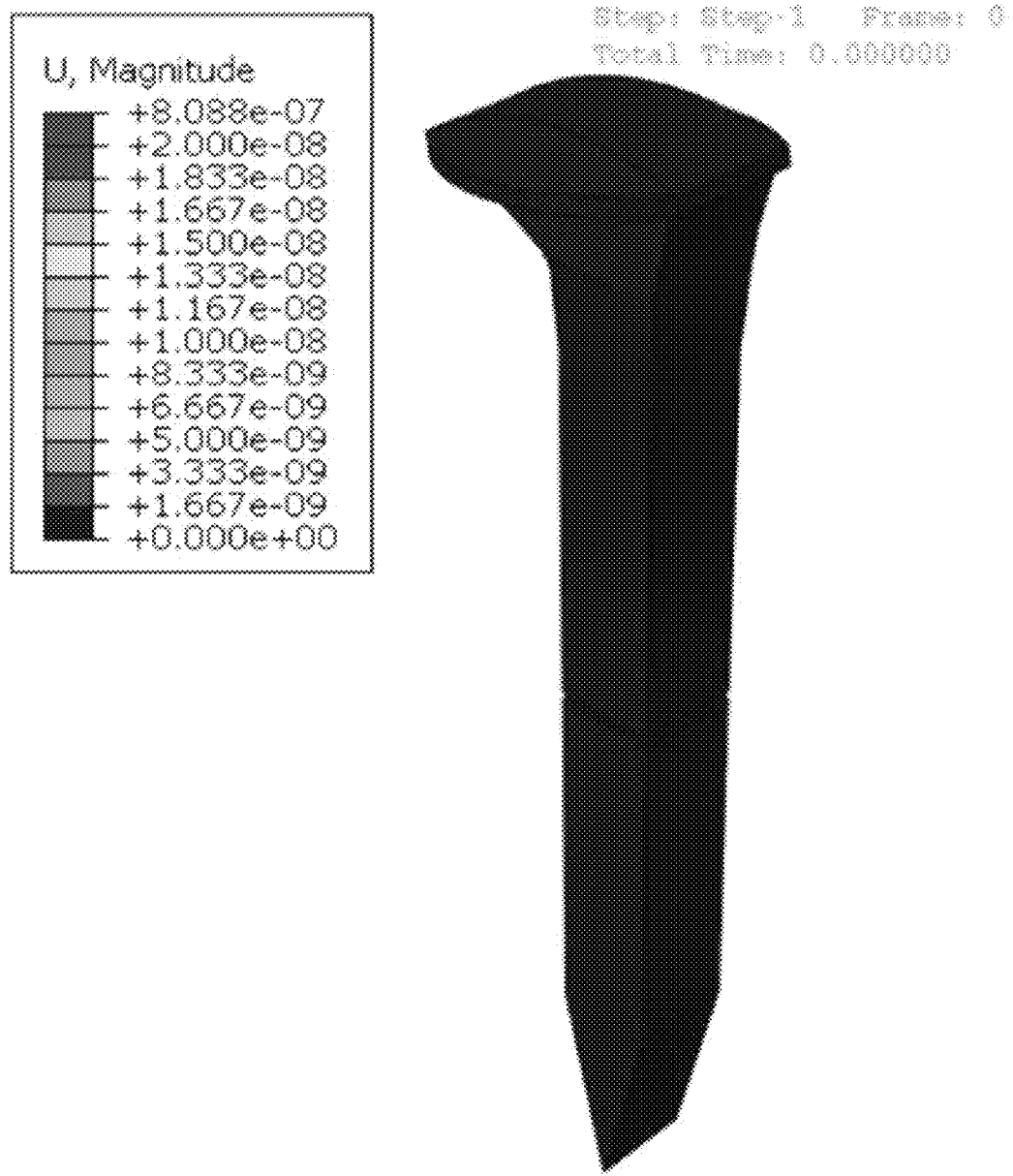
FIG. 16 shows a striped laser beam area on a fully cracked spike with a constant power per pulse=$2.0\times10^6$ W.

FIG. 16 shows a striped laser beam area on a fully cracked spike with power pulses of $2.0/4.0/8.0 \times 10^6$ W and constant laser beam area of A=$3.6 \times 10^5$ m².

Figure 17:
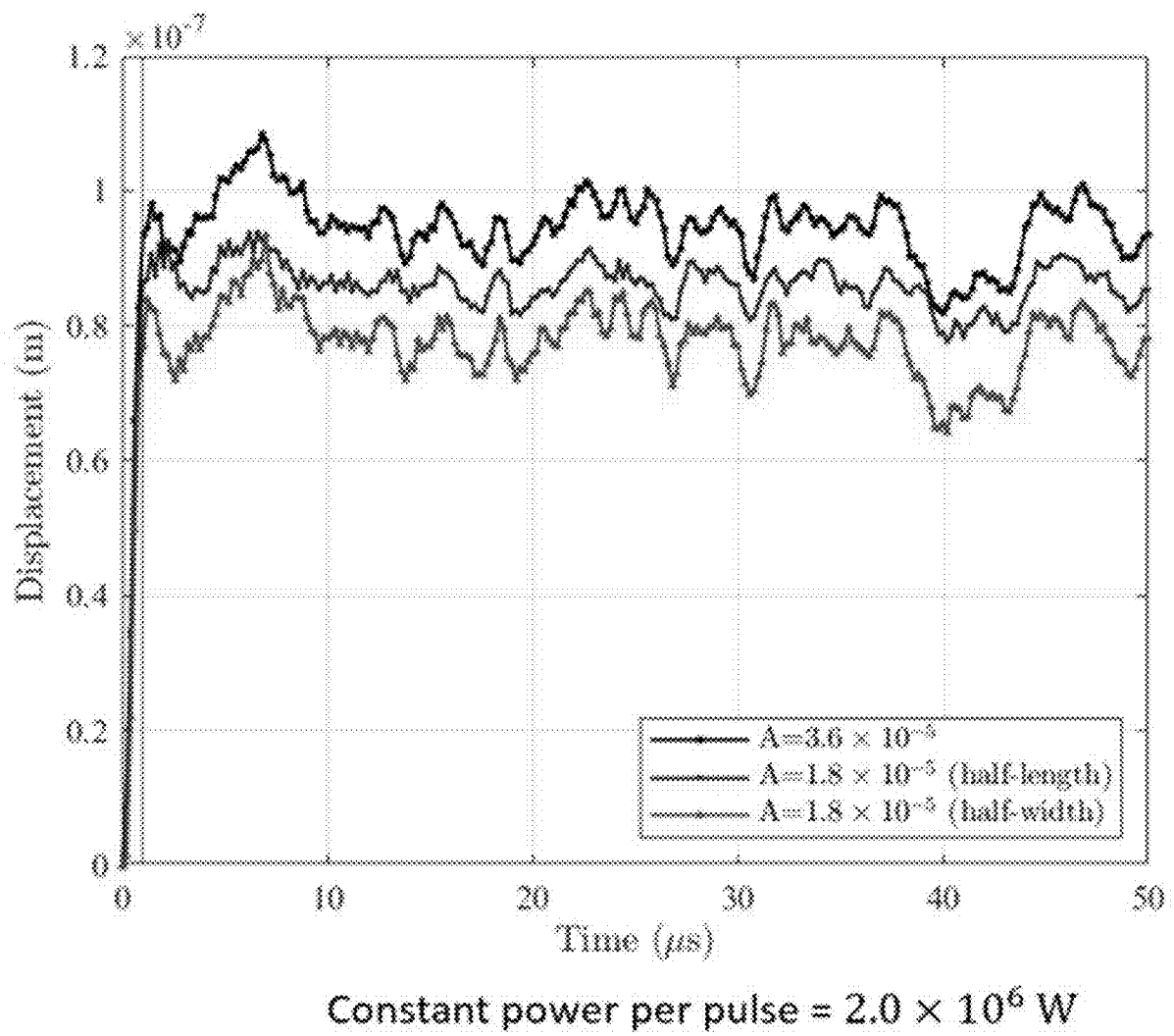
FIG. 17 shows a graph of the displacement for the spike of FIG. 16.

FIG. 17 shows a graph of the nodal displacement history on the spike top surface for the spike of FIG. 16: striped laser beam area–fully cracked spike with a constant laser beam area A=$3.6 \times 10^{-5}$ m². Power per pulse=$2.0/4.0/8.0 \times 10^6$ W.

Figure 18:
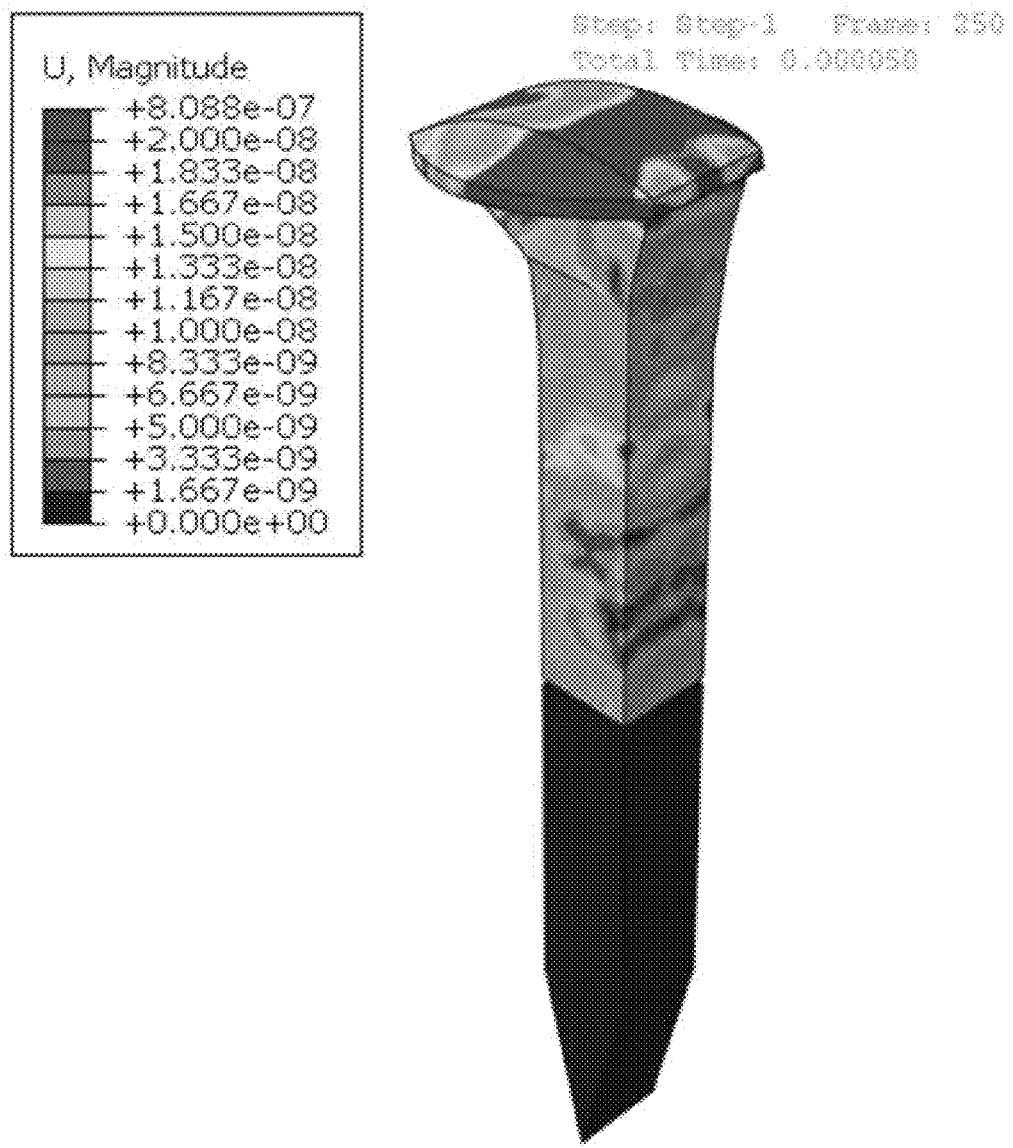
FIG. 18 shows a striped laser beam area for spikes with a constant laser beam area $A=3.6\times10^5$ m$^2$ at varying power per pulse.

FIG. 18 shows a striped laser beam area for spikes with a constant laser beam area A=$3.6 \times 10^{-5}$ m² at varying power per pulse: striped laser beam area–fully cracked spike with a constant power per pulse=$2.0 \times 10^6$ W. Laser beam area A=$3.6 \times 10^{-5}$ m², $1.8 \times 10^{-5}$ m² (half-width), $1.8 \times 10^{-5}$ m² (half-length).

Figure 19:
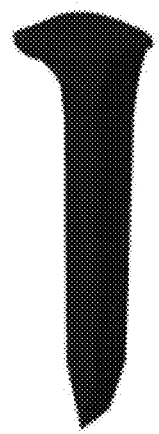
FIG. 19 shows a comparison between responses of uncracked and cracked spikes.
Figure 19:
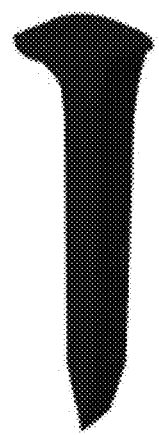
Figure 19:
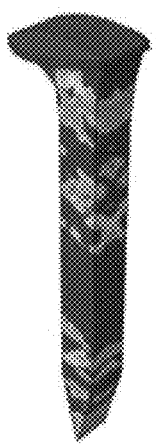

FIG. 19 shows a comparison between responses of uncracked and cracked spikes constant laser beam area A=$3.6 \times 10^{-5}$ m².

Figure 20:
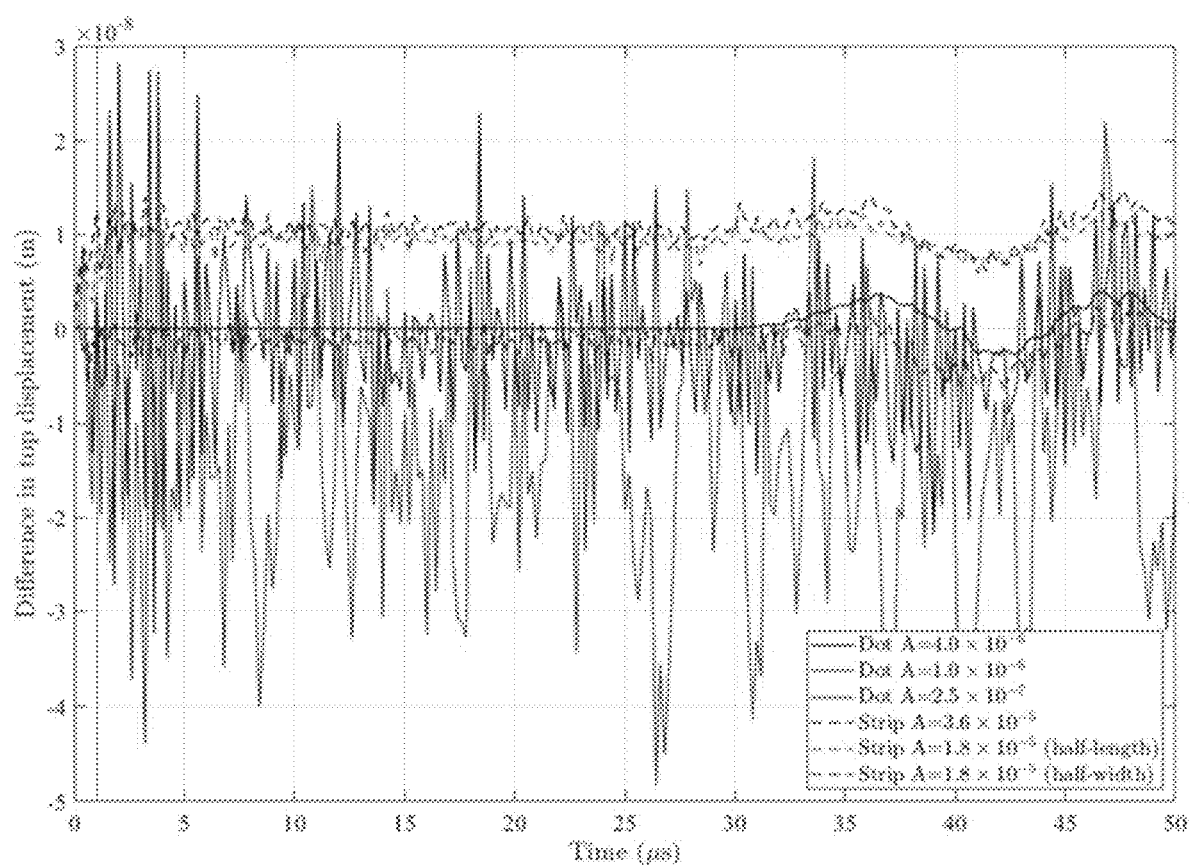
FIG. 20 shows a graph of the displacement for the spikes of FIG. 19.

FIG. 20 shows difference in spike top displacement for various loading cases (constant laser power per pulse=$2.0 \times 10^6$ W) for the spikes of FIG. 19:

$$\text{Difference}=u_{cracked}-u_{uncracked}$$

Figure 21:
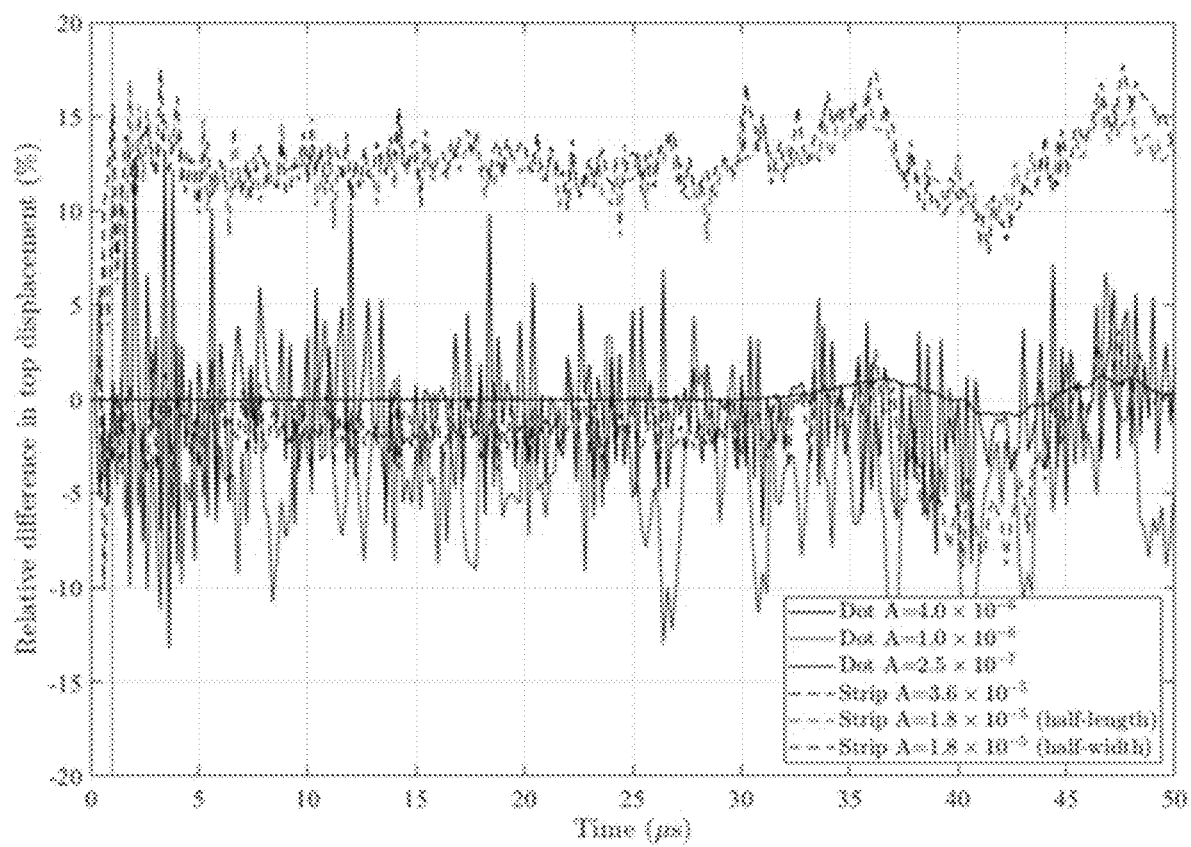
FIG. 21 shows relative difference in spike top displacement for various loading cases for the spikes of FIG. 19.

FIG. 21 shows a graph of the relative difference in spike top displacement for various loading cases (constant laser power per pulse=$2.0 \times 10^6$ W):

$$\text{Relative difference} = \frac{u_{cracked} - u_{uncracked}}{u_{uncracked}} \times 100\%$$

Various modifications and variations of the described methods, pharmaceutical compositions, and kits of the disclosure will be apparent to those skilled in the art without departing from the scope and spirit of the disclosure. Although the disclosure has been described in connection with specific embodiments, it will be understood that it is capable of further modifications and that the disclosure as claimed should not be unduly limited to such specific embodiments. Indeed, various modifications of the described modes for carrying out the disclosure that are obvious to those skilled in the art are intended to be within the scope of the disclosure. This application is intended to cover any variations, uses, or adaptations of the disclosure following, in general, the principles of the disclosure and including such departures from the present disclosure come within known customary practice within the art to which the disclosure pertains and may be applied to the essential features herein before set forth.

What is claimed is:

1. A method for detecting structural integrity in an object comprising:
   identifying via a mobile, field-deployed intelligent inspection system implementing an automatic target detection system employing computer vision a railroad spike or screw for analysis;
   employing at least one laser-air hybrid ultrasonic beam source to excite the railroad spike or screw;
   generating an internal acoustic wave within the railroad spike or screw due to heat flux, wherein the acoustic wave propagates within the object;
   receiving the acoustic wave from the railroad spike or screw via at least one capacitive air-coupled transducer; and
   determining the presence or absence of a structural fault within the railroad spike or screw based on analyzing the acoustic wave from the railroad spike or screw to enable on-site decision making to quantify crack depth and severity in real time.

2. The method of claim 1, wherein the method detects a location of the structural fault within the railroad spike or screw.

3. The method of claim 1, wherein the method detects an extent of the structural fault within the railroad spike or screw.

4. The method of claim 1, wherein the railroad spike or screw is analyzed while remaining in place on a railway.

5. The method of claim 1, further comprising employing pattern recognition to determine the absence or presence of a structural defect in the object.

6. The method of claim 1, further comprising using an artificial intelligence module to determine the absence or presence of a structural defect in the railroad spike or screw.

7. The method of claim 1, further comprising generating longitudinal, shear and/or Rayleigh waves with a single laser pulse within the railroad spike or screw.

8. The method of claim 1, further comprising comparing the analyzed acoustic wave from the railroad spike or screw to a library of structural defects to provide onsite determination of the presence or absence of a structural defect.

9. A method of non-destructive and contact-free structural integrity inspection comprising;
   recognizing via a mobile, field-deployed intelligent inspection system implementing an automatic target detection system employing computer vision an object for structural analysis;
   determining a location on the object to activate laser excitation;
   employing at least one laser-air hybrid ultrasonic beam source to excite the object;
   generating an internal acoustic wave within the object due to heat flux, wherein the acoustic wave propagates within the object;
   receiving the acoustic wave from the object via at least one capacitive air-coupled transducer; and
   determining the presence or absence of a structural fault within the object based on analyzing the acoustic wave from the object to enable on-site decision making to quantify depth and severity of the structural fault in real time;
   wherein the object is a railroad spike or screw.

10. The method of claim 9, wherein the method detects a location of the structural fault within the object.

11. The method of claim 9, wherein the railroad spike or screw is analyzed while remaining in place on a railway.

12. The method of claim 9, further comprising employing pattern recognition to determine the absence or presence of a structural defect in the object.

13. The method of claim 9, further comprising using artificial intelligence module to determine the absence or presence of a structural defect in the object.

14. The method of claim 9, further comprising generating longitudinal, shear and/or Rayleigh waves with a single laser pulse within the object.

15. The method of claim 9, further comprising comparing the analyzed acoustic wave from the object to a library of structural defects to provide onsite determination of the presence or absence of a structural defect.

* * * * *